United States Patent
Knox et al.

(10) Patent No.: US 8,734,705 B2
(45) Date of Patent: May 27, 2014

(54) METHOD FOR FABRICATION OF STRUCTURES USED IN CONSTRUCTION OF TOWER BASE SUPPORTS

(75) Inventors: Roger C. Knox, Spartanburg, SC (US); Bryant A. Zavitz, Dunwoody, GA (US); Kevin L. Kirkley, Atlanta, GA (US)

(73) Assignee: Tindall Corporation, Spartanburg, SC (US)

( * ) Notice: Subject to any disclaimer, the term of this patent is extended or adjusted under 35 U.S.C. 154(b) by 1059 days.

(21) Appl. No.: 12/482,642

(22) Filed: Jun. 11, 2009

(65) Prior Publication Data

US 2009/0308019 A1    Dec. 17, 2009

Related U.S. Application Data

(60) Provisional application No. 61/061,173, filed on Jun. 13, 2008, provisional application No. 61/113,354, filed on Nov. 11, 2008, provisional application No. 61/143,460, filed on Jan. 9, 2009, provisional application No. 61/171,965, filed on Apr. 23, 2009, provisional application No. 61/174,700, filed on May 1, 2009.

(51) Int. Cl.
*B28B 3/00* (2006.01)
*E04B 1/16* (2006.01)

(52) U.S. Cl.
USPC ............................................. 264/333; 264/31

(58) Field of Classification Search
USPC .................................................. 264/31, 333
See application file for complete search history.

(56) References Cited

U.S. PATENT DOCUMENTS

| | | | |
|---|---|---|---|
| 154,393 | A | 8/1874 | Hill |
| 617,228 | A | 1/1899 | Damm |
| 890,373 | A | 6/1908 | Orr |
| 1,031,050 | A | 7/1912 | Conzelman |
| 1,050,130 | A | 1/1913 | Harvey |

(Continued)

FOREIGN PATENT DOCUMENTS

| | | |
|---|---|---|
| DE | 2 209 978 | 9/1973 |
| DE | 38 42 026 | 7/1990 |

(Continued)

OTHER PUBLICATIONS

Machine translation of abstract of JP 9111759.

(Continued)

*Primary Examiner* — Christina Johnson
*Assistant Examiner* — Patrick Butler
(74) *Attorney, Agent, or Firm* — Oblon, Spivak, McClelland, Maier & Neustadt, L.L.P.

(57) ABSTRACT

Disclosed are apparatus and corresponding methodologies for providing a base support, such as including concrete, and used such as for a wind-driven generator. Precast concrete cylinders are stacked in place upon a platform that may be partially precast and partially cast in place during assembly and supported, in certain embodiments, by plural concrete legs, the other ends of which are supported on a unitary or subdivided concrete foundation. In other embodiments, the platform may be supported by ribbed concrete panels. The concrete cylinders are glued together using an epoxy and then secured by an internal vertical post tension system extending from the platform to the upper most cylinder. Methodologies and apparatus for fabrication of concrete structure used in constructing the base support are also disclosed, with a focus on staves and various ring piece constructions.

16 Claims, 23 Drawing Sheets

(56) References Cited

U.S. PATENT DOCUMENTS

| | | |
|---|---|---|
| 1,069,328 A | 8/1913 | Griffin |
| 1,194,305 A | 8/1916 | McMillan |
| 1,264,063 A | 4/1918 | Guichard |
| 1,425,860 A | 8/1922 | Johnson |
| 1,497,141 A | 6/1924 | Hart |
| 1,545,456 A | 7/1925 | Rastetter |
| 1,567,301 A | 12/1925 | Ross |
| 1,647,925 A | 11/1927 | May |
| 2,032,030 A | 2/1936 | Talen |
| 2,145,232 A | 1/1939 | Bauer |
| 2,374,624 A | 4/1945 | Schwendt |
| 2,483,175 A | 9/1949 | Billner |
| 2,524,390 A | 10/1950 | Laubach et al. |
| 2,826,800 A | 3/1958 | Van Buren |
| 2,858,693 A | 11/1958 | Levert |
| 2,958,983 A | 11/1960 | Hoover |
| 2,966,714 A | 1/1961 | Eways et al. |
| 3,182,948 A | 5/1965 | Lawrence |
| 3,230,911 A | 1/1966 | Garlock, Jr. |
| 3,293,345 A | 12/1966 | Zebrowski et al. |
| 3,363,795 A | 1/1968 | Stuart, III |
| 3,476,847 A | 11/1969 | Drever et al. |
| 3,533,819 A | 10/1970 | Pennachetti et al. |
| 3,653,168 A | 4/1972 | Cook |
| 3,659,077 A | 4/1972 | Olson |
| RE27,732 E | 8/1973 | Van Buren |
| 3,763,608 A | 10/1973 | Chamlee |
| 3,793,794 A | 2/1974 | Archer et al. |
| 3,999,337 A | 12/1976 | Tomassetti et al. |
| 4,025,021 A | 5/1977 | Stout |
| 4,077,174 A | 3/1978 | de Leaumont |
| 4,137,535 A | 1/1979 | Rupprecht |
| 4,148,850 A | 4/1979 | Schulte et al. |
| 4,155,210 A | 5/1979 | de Leaumont |
| 4,166,347 A | 9/1979 | Pohlman et al. |
| 4,191,521 A * | 3/1980 | Muldery et al. ............... 425/432 |
| 4,196,551 A | 4/1980 | Bondarenko et al. |
| 4,244,682 A | 1/1981 | Willingham |
| 4,272,929 A | 6/1981 | Hanson |
| 4,299,639 A * | 11/1981 | Bayer ............................ 156/104 |
| 4,403,916 A | 9/1983 | Skelskey |
| 4,406,094 A | 9/1983 | Hempel et al. |
| 4,479,334 A | 10/1984 | Goode |
| 4,488,392 A | 12/1984 | Pearcey et al. |
| 4,555,888 A | 12/1985 | Goldenberg et al. |
| 4,594,824 A | 6/1986 | Ziegler et al. |
| 4,655,013 A | 4/1987 | Ritland |
| 4,663,900 A | 5/1987 | Rehm et al. |
| 4,708,621 A | 11/1987 | Schmidgall et al. |
| 4,799,307 A | 1/1989 | Reigstad et al. |
| 4,826,639 A * | 5/1989 | Vidal et al. ...................... 264/32 |
| 4,910,940 A | 3/1990 | Grady, II |
| 5,038,540 A | 8/1991 | Krautz |
| 5,056,284 A | 10/1991 | Ruckdeschel et al. |
| 5,586,417 A | 12/1996 | Henderson et al. |
| 5,724,775 A | 3/1998 | Zobel et al. |
| 5,749,198 A | 5/1998 | Johnson |
| 5,757,088 A | 5/1998 | Baeumen et al. |
| 5,969,243 A | 10/1999 | Frey et al. |
| 6,167,673 B1 | 1/2001 | Fournier |
| 6,170,220 B1 | 1/2001 | Moore, Jr. |
| 6,176,055 B1 | 1/2001 | Fu |
| 6,278,198 B1 | 8/2001 | Willis et al. |
| 6,283,269 B1 | 9/2001 | Mayer |
| 6,284,172 B1 * | 9/2001 | Hume ......................... 264/40.5 |
| 6,299,336 B1 | 10/2001 | Hulse |
| 6,318,034 B1 | 11/2001 | Zavitz et al. |
| 6,408,575 B1 | 6/2002 | Yoshida et al. |
| 6,467,233 B1 | 10/2002 | Maliszewski et al. |
| 6,470,645 B1 | 10/2002 | Maliszewski et al. |
| 6,522,025 B2 | 2/2003 | Willis et al. |
| 6,532,700 B1 | 3/2003 | Maliszewski et al. |
| 6,614,125 B2 | 9/2003 | Willis et al. |
| 6,658,812 B1 | 12/2003 | Tomlinson et al. |
| 6,782,667 B2 | 8/2004 | Henderson |
| 6,834,911 B2 | 12/2004 | Schillinger et al. |
| 6,851,231 B2 | 2/2005 | Tadros et al. |
| 6,859,768 B1 | 2/2005 | Wakelam et al. |
| 6,883,532 B2 | 4/2005 | Rau |
| 6,888,264 B1 | 5/2005 | Willis et al. |
| 6,903,705 B2 | 6/2005 | Livadiotti |
| 6,906,684 B2 | 6/2005 | Turner |
| 6,907,706 B1 | 6/2005 | Schippmann et al. |
| 7,011,108 B2 | 3/2006 | Benckert et al. |
| 7,021,020 B2 | 4/2006 | Simmons et al. |
| 7,114,295 B2 | 10/2006 | Wobben |
| 7,152,384 B1 | 12/2006 | McCarty |
| 7,160,085 B2 | 1/2007 | de Roest |
| 7,197,854 B2 | 4/2007 | Bettigole et al. |
| 7,276,808 B2 | 10/2007 | Weitkamp et al. |
| 7,360,340 B2 | 4/2008 | Grundman et al. |
| 7,464,512 B1 | 12/2008 | Perina |
| 7,739,843 B2 | 6/2010 | Cortina-Cordero |
| 7,770,343 B2 | 8/2010 | Montaner Fraguet et al. |
| 7,980,814 B2 | 7/2011 | Nieuwenhuizen |
| 8,104,242 B1 | 1/2012 | Fouad et al. |
| 8,136,329 B2 | 3/2012 | Willis |
| 8,146,320 B2 | 4/2012 | Seidel et al. |
| 2003/0000165 A1 * | 1/2003 | Tadros et al. ................ 52/223.4 |
| 2003/0021636 A1 | 1/2003 | Silber |
| 2004/0211148 A1 * | 10/2004 | Foust et al. .................. 52/720.1 |
| 2004/0237439 A1 | 12/2004 | Powell |
| 2005/0105969 A1 * | 5/2005 | Smith .............................. 404/34 |
| 2005/0120644 A1 | 6/2005 | Tadros et al. |
| 2005/0129504 A1 | 6/2005 | De Roest |
| 2005/0166521 A1 | 8/2005 | Silber |
| 2006/0120809 A1 | 6/2006 | Ingram et al. |
| 2006/0156681 A1 | 7/2006 | Fernandez Gomez et al. |
| 2006/0254168 A1 | 11/2006 | Wobben |
| 2006/0254196 A1 | 11/2006 | Wobben |
| 2006/0267348 A1 | 11/2006 | Weitkamp et al. |
| 2007/0095008 A1 | 5/2007 | Arsene |
| 2007/0243063 A1 | 10/2007 | Schellstede |
| 2007/0251187 A1 | 11/2007 | Schiffer et al. |
| 2007/0269272 A1 | 11/2007 | Kothnur et al. |
| 2008/0028715 A1 | 2/2008 | Foss et al. |
| 2008/0040983 A1 | 2/2008 | Fernandez Gomez et al. |
| 2008/0209842 A1 | 9/2008 | Montaner Fraguet et al. |
| 2009/0000227 A1 | 1/2009 | Jakubowski et al. |
| 2009/0031639 A1 | 2/2009 | Cortina/Cordero |
| 2010/0071301 A1 | 3/2010 | Herrius De Roest |
| 2010/0139181 A1 | 6/2010 | Cortina-Cordero et al. |
| 2011/0056151 A1 | 3/2011 | Marmo et al. |
| 2011/0113708 A1 | 5/2011 | Skjaerbaek et al. |
| 2011/0138704 A1 | 6/2011 | Bagepalli et al. |
| 2011/0138707 A1 | 6/2011 | Bagepalli |
| 2011/0239564 A1 | 10/2011 | Zheng et al. |
| 2011/0278431 A1 * | 11/2011 | Knox et al. ..................... 249/141 |
| 2011/0314767 A1 | 12/2011 | Gee |
| 2012/0017536 A1 | 1/2012 | Häger |

FOREIGN PATENT DOCUMENTS

| | | |
|---|---|---|
| DE | 40 23 465 | 2/1992 |
| DE | 41 00 995 | 7/1992 |
| DE | 198 32 921 | 2/2000 |
| DE | 203 09 447 | 9/2003 |
| EP | 0 960 986 | 12/1999 |
| EP | 1 156 175 | 11/2001 |
| FR | 544.863 | 10/1922 |
| FR | 1.145.789 | 10/1957 |
| GB | 2 366 820 | 3/2002 |
| JP | 55-32813 | 3/1980 |
| JP | 4-189986 | 7/1992 |
| JP | 9-111759 | 4/1997 |
| JP | 9-189148 | 7/1997 |
| JP | 9-195584 | 7/1997 |
| JP | 9-235912 | 9/1997 |
| JP | 9-250256 | 9/1997 |
| JP | 3074144 | 12/2000 |
| JP | 2001-200658 | 7/2001 |
| JP | 2004-11210 | 1/2004 |
| JP | 2008-248476 | 10/2008 |

(56) References Cited

FOREIGN PATENT DOCUMENTS

| JP | 2009-19550 A | * | 1/2009 |
| SE | 111 151 | | 7/1944 |
| WO | WO 2005/028781 | | 3/2005 |

OTHER PUBLICATIONS

PCT International Search Report for PCT International Application No. PCT/US2009/047135 dated Jan. 27, 2011.
Written Opinion of the International Searching Authority for PCT International Application No. PCT/US02009/047135 dated Jan. 27, 2011.
Translation of face/abstract of JP 2004011210.
Translation of face/abstract of JP 2008248476.
Automated translation of DE 2 209 978 (translated abstract not available).
Automated translation of DE 38 42 026 and translated abstract.
Automated translation of DE 40 23 465 and translated abstract.
Automated translation of DE 41 00 995 and translated abstract.
Automated translation of DE 198 32 921 and translated abstract.
Automated translation of EP 1 156 175 and translated abstract.
Automated translation of EP 0 960 986.
Automated translation of FR 544.863 (translated abstract not available).
Automated translation of Abstract of JP 4-189986.
Automated translation of Abstract of JP 2001-200658.
Automated translation of Abstract of DE 203 09 447.
Automated translation of FR 1.145.789 (translated abstract not available).
Automated translation of Abstract of JP 9-189148.
Automated translation of Abstract of JP 9-195584.
Automated translation of Abstract of JP 9-250256.
Automated translation of Abstract of JP 9-235912.
Translation of JP 55-32813.
Translation of JP 3074144.
Written Opinion of the International Searching Authority for PCT International Application No. PCT/US2009/047136 completed Jul. 24, 2009, mailed Aug. 4, 2009.
Micon Technical Specification MICON M530-250 KW, Micon A/S, Nov. 20, 1989.
Die Welt Finanzen article, Mar. 29, 2001 (no translation available).
*Windblatt, The Enercon Magazine*, Mar. 2001.
Khatri International Newsletter, Khatri International Structural and Civil Engineers, Sep. 2002.
"Integrated Installation for Offshore Wind Turbines" prepared by J. Way, H. Bowerman, contracted by Corus UK Ltd. for DTI New and Renewable Energy Programme managed by Future Energy Solutions, published 2003 (document available at http://www.berr.gov.uk/files/file20343.pdf).
"From the European Front: Tower Power", *Concrete Products*, Apr. 1, 2003; provided by Liebherr-Mischtechnik GmbH, represented in North America by Virginia-based Liebherr Concrete.
Autocor brochure (Automatic concrete placing on rail) by Putzmeister, copyright 2004.
"LWST Phase I Project Conceptual Design Study: Evaluation of Design Construction Approaches for Economical Hybrid Steel/Concrete Wind Turbine Towers Jun. 28, 2002-Jul. 31, 2004" by M.W. LaNier, a Subcontractor Report for National Renewable Energy Laboratory, Jan. 2005 (document available at http://www.nrel.gov/docs/fy05osti/36777.pdf).
Enercon GmbH and Enercon (India) website information, dated "Sep. 15, 2008".
"Advanced Tower Solutions for Large Wind Turbines and Extreme Tower Heights" by F.J. Brughuis for Mecal Applied Mechanics BV. Advanced Tower Systems ATS Hybrid Tower from Advanced Tower Systems website (www.advancedtowers.com), dated "Oct. 1, 2009".
"Danish wind turbines (1): Portrait of Micron's 250 'kW Turbine" by Strange Skriver, technical consultant of Danish Wind Turbine Owners' Association, *Naturlig Energi* Magazine, Sep. 2005.
*Putzmeister Post, The Magazine for Our Customers and Friends*, copyright 2005.
"Advanced Wind Technology: New Challenges for a New Century" by R. Thresher and A. Laxson, presented at the European Wind Energy Conference in Athens, Greece, Feb. 27-Mar. 2, 2006.
"Automated concrete placement in a precasting plant", Putzmeister AG—Concrete Pumps—Autocor, copyright 1998-2006.
"Precast concrete elements for the wind power industry, Autocor system in operation at Emden, Germany", Putzmeister AG, BFT, Aug. 2006.
Betontechnik article entitled "Türme für Windkraftanlagen aus Beton-fertigteilen mit selbstverdichtendem Beton", BWI—BetonWerk International, Jun. 2002 (no translation available).
"Patents in Structural Engineering" by Christopher A. Rothe, Esq., *Structure* Magazine, Nov. 2008.
Enercon Wind Turbines Technology & Service brochure, ENERCON GmbH (www.enercon.de).
Enercon Wind Turbines Product Overview brochure, ENERCON GmbH, (www.enercon.de).
"Development of the Concrete Tower for Large Scale Wind Power Generating System" by Kiyoroku Fukayama et al. for PC Bridge Company Limited.
Tempest Fireco Towers Pneumatic Tower "Compact" Option brochure.
Grupo INNEO Precast Concrete Wind Towers website information, copyright 2008 (www.inneotorres.com).
"Three Promising Projects on the Orkneys", International, WINDBLATT Mar. 2009, pp. 14 and 15.
"Precision Teamwork on Precast Concrete Towers", Job Profiles, WINDBLATT Mar. 2009, pp. 16 and 17.
International Search Report for PCT International Application PCT/US2009/047136 dated Aug. 4, 2009.

* cited by examiner

US 8,734,705 B2

METHOD FOR FABRICATION OF STRUCTURES USED IN CONSTRUCTION OF TOWER BASE SUPPORTS

PRIORITY CLAIM

This application claims the benefit of previously filed U.S. Provisional Patent Application entitled "CONCRETE BASE SUPPORT FOR WIND-DRIVEN POWER GENERATORS," assigned U.S. Ser. No. 61/061,173, filed Jun. 13, 2008; and claims the benefit of previously filed U.S. Provisional Patent Application entitled "BASE SUPPORT FOR WIND-DRIVEN POWER GENERATORS," assigned U.S. Ser. No. 61/113,354, filed Nov. 11, 2008; and claims the benefit of previously filed U.S. Provisional Patent Application entitled "BASE SUPPORT FOR WIND-DRIVEN POWER GENERATORS," assigned U.S. Ser. No. 61/143,460, filed Jan. 9, 2009; and claims the benefit of previously filed U.S. Provisional Patent Application entitled "BASE SUPPORT FOR WIND-DRIVEN POWER GENERATORS," assigned U.S. Ser. No. 61/171,965, filed Apr. 23, 2009; and claims the benefit of previously filed U.S. Provisional Patent Application entitled "METHOD AND APPARATUS FOR FABRICATION OF STRUCTURES USED IN CONSTRUCTION OF TOWER BASE SUPPORTS," assigned 61/174,700, filed May 1, 2009; all of which are fully incorporated herein by reference for all purposes.

FIELD OF THE INVENTION

The present subject matter relates to towers. More specifically, the present subject matter relates to methodology and apparatus for fabrication of staves and other components as may be used in tower constructions, such as may be used in conjunction with dynamic structures such as wind-driven power generators or windmills or with other structures such as water towers.

BACKGROUND OF THE INVENTION

Construction of towers for support of various items has been practiced for many years. Various towers of various materials have been provided to support electrical transmission lines including wooden, steel, and, more recently, concrete. In like manner, wind driven apparatus including windmills and wind-driven power generators in various forms and designed for many purposes, including pumping of water from wells as well as, more recently, generation of electrical power, have also been developed.

U.S. Pat. No. 3,793,794 to Archer et al. entitled "Stacked Column" is directed to a column comprised of a plurality of concrete-filled stacked tubes.

U.S. Pat. No. 4,406,094 to Hempel et al. entitled "Apparatus for Anchoring Self-supporting, Tall Structures" is directed to an anchoring self-supporting tall structure such as masts, towers, or the like in a foundation. The mast or tower may be used to support a wind-driven power generator.

U.S. Pat. No. 5,761,875 to Oliphant et al. entitled "Reinforced concrete Pole with Attachment Mechanism" is directed to an attachment mechanism which provides a structurally sound means to attach a reinforced concrete pole to a support structure.

U.S. Pat. No. 6,532,700 to Maliszewski et al. entitled "Flange With Cut For Wind Tower" is directed to a flange for making a tower for a wind generator made up of a plurality of cylindrical steel segments.

U.S. Pat. No. 7,155,875 to Henderson entitled "Method of Forming a Perimeter Weighted Foundation For Wind Turbines And The Like" is directed to a weighted foundation having a central pier pedestal and an enlarged base space outwardly and extending below the pedestal.

U.S. Pat. No. 5,586,417 to Henderson, et al. entitled "Tensionless pier foundation" is directed to a hollow, cylindrical pier foundation is constructed of cementitious material poured in situ between inner and outer cylindrical corrugated metal pipe shells.

The disclosures of all the patents referenced herein are incorporated by reference, for all purposes.

In an article entitled "Precast concrete elements for wind power industry," German company Enercon GmbH has described methodology for casting concrete. Mexican company Postensa Wind Structures describes on its website www.postensaws.com a tilt up, precast on-site construction system for concrete towers for use with wind driven power generators.

While various implementations of tower constructions have been developed, and while various combinations of materials have been employed for tower construction, no design has emerged that generally encompasses all of the desired characteristics as hereafter presented in accordance with the subject technology.

SUMMARY OF THE INVENTION

In view of the recognized features encountered in the prior art and addressed by the present subject matter, improved apparatus and methodology are presently disclosed for providing base supports for windmills and wind-driven power generators (e.g., wind turbines). It should be appreciated that while the present disclosure is directed in exemplary fashion to support structure involving precast concrete, various presently disclosed constructions may be alternatively practiced in accordance with the present subject matter.

In addition, it should be appreciated that while the present disclosure is directed in exemplary fashion to support structure for windmills and similar devices, such is not necessarily a specific limitation of the present subject matter. For example, it should be clear to those of ordinary skill in the art that a tower constructed in accordance with the present technology may well be used to support, for example, a television transmitter aerial or other radio signal broadcasting aerial. Alternatively, towers constructed in accordance with present technology may be used to support any type device that may require placement above local ground level for more effective operation. Such other present uses may include, for example, such as electrical power transmission lines and athletic field lighting equipment.

In one exemplary configuration, support for windmills may be provided by stacking on-site a plurality of precast concrete cylinders to form a self-supporting tower.

In one of its simpler forms, a first number of the precast concrete cylinders may be provided as reinforced prestressed concrete while a second number of the precast concrete cylinders may be provided as ultra high performance fiber reinforced concrete.

In accordance with aspects of certain embodiments of the present subject matter, methodologies are provided to secure individual precast concrete cylinders together using adhesives.

In accordance with certain aspects of other embodiments of the present subject matter, methodologies have been developed to provide a temporary support for a raised platform.

In accordance with yet additional aspects of further embodiments of the present subject matter, apparatus and accompanying methodologies have been developed to provide an internal vertical post tensioning system within the stacked concrete cylinders to maintain structural integrity of the stacked assembly.

In accordance with yet further embodiments of the present subject matter, a ribbed concrete block structure may be provided as an alternative support for a raised tower supporting platform.

In yet still further alternative embodiments of the present subject matter, a tower supporting platform may correspond in part to a precast portion and a field poured portion.

In accordance with further embodiments of the present subject matter, a poured-in-place concrete circular strip footing may be provided requiring little or no excavation.

In accordance with aspects of certain exemplary embodiments, a conical skirt may be provided to distribute the tower load to the foundation.

In accordance with yet further aspects of certain exemplary embodiments of the present subject matter the foundation could be precast and cast monolithically with vertical stave elements.

In accordance with yet still further aspects of certain exemplary embodiments, the foundation may be configured to add additional dead load by means of external ballasts.

In accordance with yet still further aspects of certain exemplary embodiments, improved methodology and apparatus for fabricating concrete structures used in the formation of base supports are provided.

One present exemplary method in accordance with the present technology relates to a method for fabricating precast concrete structures for use in the construction of a support tower, Such a method may include providing a concrete form having a transverse axis and a longitudinal axis, such concrete form defining a casting cavity having at least one injection port and at least one ventilation port; tilting such concrete form about such transverse axis or such longitudinal axis or both such that a first area of such casting cavity is relatively raised with respect to a second area of such casting cavity; and injecting concrete into such casting cavity through such at least one injection port.

In variations of the foregoing exemplary method, such injecting step may comprise injecting concrete into such casting cavity upwardly from the second area of such casting cavity to the relatively raised first area thereof. Also, optionally, such tilting step may include selectively tilting such concrete form about both its transverse axis and its longitudinal axis. In some instances, such tilting step may include tilting such concrete form about 45° about its transverse axis and about 6° about its longitudinal axis.

In other alternatives of the foregoing, such method may further include providing such concrete form with a plurality of anchors; and securing pre-stressing tendons to such plurality of anchors prior to injecting concrete into such casting cavity. In another alternative, such method may include in instances vibrating such concrete form to assist injection and/or consolidation of concrete into such casting cavity; and curing such concrete in such casting cavity to form a casting. Such exemplary method may also include optionally curing such concrete in such casting cavity to form a casting; and heating such concrete prior to injecting and/or heating such casting cavity to assist curing of such concrete in such casting cavity.

Other variations of such exemplary method may include providing such injection port with a shut-off valve; and closing such shut-off valve after concrete has been injected into such injection port. Yet other present exemplary variations may relate to providing such concrete form with a plurality of injection ports disposed along such casting cavity; injecting concrete made with high flow or self-consolidating concrete mix into a first injection port of such plurality of injection ports; and injecting concrete made with high flow or self-consolidating concrete mix into a second injection port of such plurality of injection ports, with such second injection port relatively raised with respect to such first injection port.

In some instances, such casting cavity may be shaped to form one of a concrete stave with a top portion and with a lower portion having a greater width than such top portion, or to form a concrete tubular structure.

Another present exemplary methodology embodiment relates to a method of fabricating structures for use in construction of a support tower. Such an exemplary present method may include providing respective outer diameter and inner diameter forms with the outer diameter form situated over the inner diameter form so as to collectively provide a concrete form defining a casting volume, such concrete form having at least one inlet for injection of concrete into such casting volume and at least one outlet for the displacement of air therefrom; injecting concrete into such casting volume; curing such concrete in such casting volume so as to form a casting; generating a first thermal gradient between such casting and such outer diameter form; removing such outer diameter form from such casting; generating a second thermal gradient between such casting and such inner diameter form; and removing such casting from such inner diameter form.

In the foregoing exemplary method, optionally generating such first thermal gradient may include spraying steam onto such outer diameter form, or using at least one heater embedded in such outer diameter form, or combinations thereof. Similarly, generating such second thermal gradient may include spraying water or air or combinations thereof at ambient temperature onto such inner diameter form. Such step of removing such outer diameter form may include lifting such outer diameter form. Such step of removing such casting from such inner diameter form may include pushing up on such casting, or lifting such casting or combinations thereof.

Yet another present exemplary embodiment relates to a method of fabricating concrete structures for use in the construction of a support tower, such a method preferably comprising providing a lower concrete form defining a transverse axis and a longitudinal axis; providing an upper concrete form having a top surface and a bottom surface; inverting such upper concrete form so that such bottom surface of such upper concrete form is above such top surface of such concrete form; placing structural members onto such bottom surface of such upper concrete form; securing such upper concrete form to such lower concrete form so as to collectively construct a concrete form assembly defining an enclosed casting cavity having at least one concrete injection port and at least one ventilation port; tilting such concrete form assembly about such transverse axis or such longitudinal axis or both such that a first casting area of such casting cavity is raised with respect to a second casting area of such casting cavity; injecting concrete into such casting cavity through such at least one concrete injection port thereof, upwardly from such second casting area of such casting cavity to such first casting area thereof such casting cavity; curing such concrete in such enclosed casting cavity to for a casting; separating such upper concrete form from such lower concrete form; and removing such casting.

In one exemplary variation of the foregoing, such tilting step may include tilting such concrete form about 45' about such transverse axis and about 6° about such longitudinal axis. In another present exemplary variation, such method may further include providing such concrete form with a plurality of injection ports disposed along such casting cavity; injecting concrete into a first injection port of such plurality of injection ports; and injecting concrete into a second injection port of such plurality of injection ports, with such second injection port relatively raised with respect to such first injection port. In still further variations, such casting cavity may be shaped to form one of a concrete stave with a top portion and with a lower portion having a greater width than such top portion, or to form a concrete tubular structure.

It is to be understood by those of ordinary skill in the art from the disclosure herewith that the present subject matter equally relates to both methodology as well as apparatus subject matter. For example, one present exemplary embodiment relates to a concrete form, preferably comprising a lower concrete form; and an upper concrete form secured to such lower form to define an enclosed casting volume within such concrete form. In such exemplary apparatus, preferably such lower and upper concrete forms collectively further define in such casting volume at least one concrete injection port and at least one ventilation port, and provide such casting volume with a shape for forming therein a concrete stave with a top portion and with a lower portion having a greater width than such top portion.

In variations of the foregoing apparatus, such exemplary concrete form may further include anchors for securing prestressing tendons. Still further, in some variations, such ventilation port may be configured to be closed off; and such injection port may include a shut-off valve. In yet other alternatives, such concrete form may further include a plurality of injection ports disposed along such casting volume; an embedded heater; and a vibrator. In some embodiments, such upper form and such lower form each may include structural reinforcing members to allow such concrete form to be transported by a crane or cart. In some, such concrete form may further include at least one attachment mechanism for securing such concrete form to a crane or cart.

In another present exemplary embodiment, an exemplary concrete form may comprise an inner diameter form; and an outer diameter form received over such inner diameter form to define a casting volume within such concrete form. In such arrangement, preferably per present subject matter such inner and outer diameter forms collectively may further define in such casting volume at least one injection port and at least one ventilation port, and provide such casting volume with a shape for forming therein a concrete tubular structure.

In some present variations of the foregoing, such concrete form may further include anchors for securing post-tensioning ducts. Alternatively, such ventilation port may be configured to be closed off; and such injection port may include a shut-off valve. In other variations, such concrete form may further include a plurality of injection ports disposed along such casting volume; an embedded heater; and a vibrator. Also, such outer diameter form and such inner form may each include structural reinforcing members to allow such concrete form to be transported by a crane or cart. Such concrete form may further include at least one attachment mechanism for securing such concrete form to a crane or cart; and such inner diameter form may comprise at least one jacking port.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures).

Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
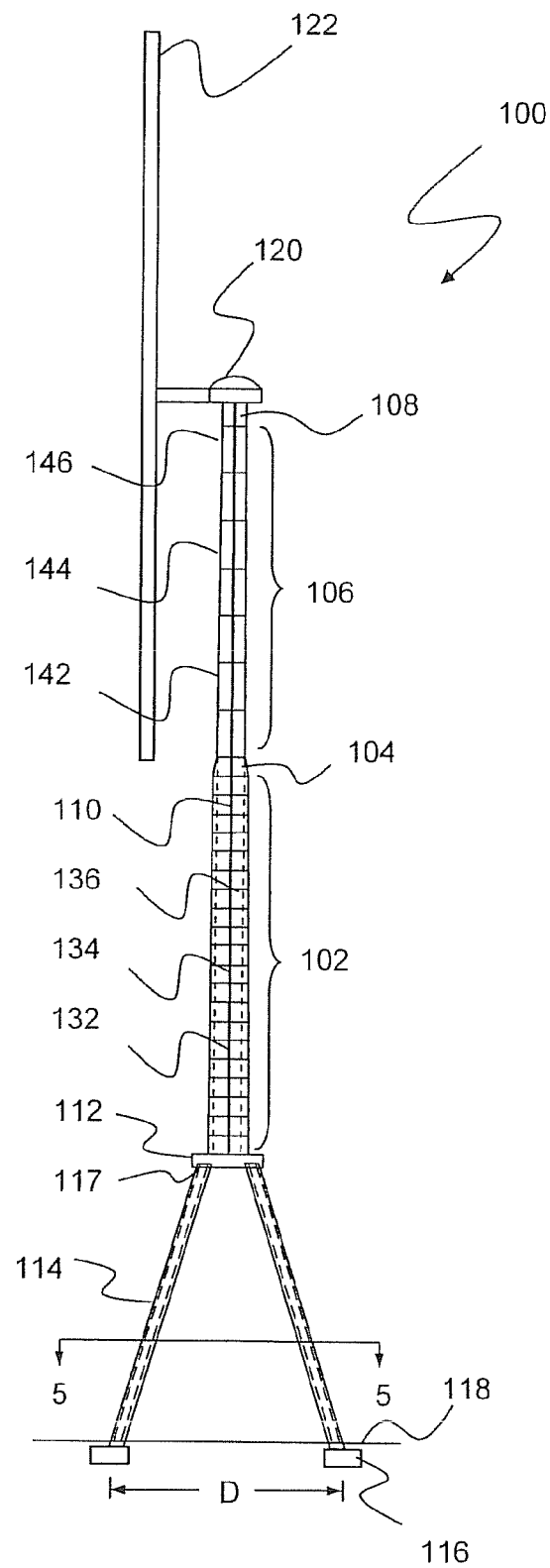
FIG. 1 illustrates an exemplary embodiment of a concrete base support, such as for a windmill, in accordance with the present technology, fully installed and supporting a representative exemplary windmill.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with apparatus and corresponding methodology for providing base supports, such as comprised at least in part of precast concrete, and such as for windmills and wind-driven power generators, or other apparatuses.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject concrete base support, shown for example, in support of representative exemplary windmills. With reference to the drawings, FIG. 1 illustrates an exemplary embodiment of a concrete base support generally 100, such as for a windmill, in accordance with the present technology, illustrated as fully installed and supporting a representative generator generally 120 and accompanying turbine blade assembly generally 122. Those of ordinary skill in the art will appreciate that particular internal details regarding such generator 120 and turbine blade assembly 122 form no particular aspects of the present subject matter, wherefore further additional detailed discussion of such devices is not required for a complete understanding of the present subject matter.

Concrete base support 100 corresponds to a number or plurality of sections, all of which are made of concrete in various forms, so as to provide particular capabilities as required for desired support of generator 120 and turbine blade assembly 122.

As may be seen from FIG. 1, concrete base support 100 corresponds to a leg section comprising, in an exemplary configuration, such as eight legs representatively illustrated by leg 114. Various numbers of legs may be practiced in accordance with the present subject matter. Each of such legs 114 rests on an individual foundation block generally 116. Further, each such leg generally 114 is preferably inserted into one of a corresponding number of mating holes 117 in a platform 112. In an exemplary configuration, platform 112 may be constructed of reinforced concrete, may be circular in shape, may have a diameter of twenty six feet and may be four feet thick. Each leg 114 may measure four feet by four feet and have eight inch thick walls.

Portions 102, 104, 106, and 108 of concrete base support 100 preferably vary in size as illustrated in and represented by FIG. 1, and also preferably are constructed with varying concrete compositions. Portion 102 of concrete base support 100 corresponds to a number of stacked reinforced prestressed concrete cylinders representatively illustrated as cylinders 132, 134, 146. Each cylinder 132, 134, 136 may also include reinforcing bars (rebars), for example, common steel bar, as is commonly used in reinforced concrete. Further, it should be noted that while the present description may speak of concrete cylinders, such description does not necessarily mean that the outer and/or inner shape is circular. In fact the concrete cylinders constructed in accordance with the present technology may correspond to cylindrical, octagonal, hexagonal, or any other outside and/or inside surface formation or combinations thereof.

Each of the concrete cylinders 132, 134, 136 in section 102 of concrete base support generally 100 preferably is substantially the same size and similarly constructed of reinforced prestressed concrete. Each of such cylinders also is preferably constructed for mating assembly such that the top of one cylinder is shaped to mate with the bottom of the next, i.e., adjacent, cylinder. As the cylinders 132, 134, 136 are stacked, each preferably is adhesively secured together using, for example, an epoxy or grout. In an exemplary configuration, twenty cylinders may be stacked together to form section 102 of concrete base support 100 where each cylinder 132, 134, 136 may be six feet tall thereby producing a section 102 which is one hundred twenty feet tall.

Following assembly of section 102 of concrete base support 100, a transition ring or cylinder 104 is placed on the top cylinder of portion 102. As may be seen from the representations of present FIG. 1, such transition cylinder 104 preferably varies in diameter from a diameter corresponding to the diameter of section 102 to a smaller diameter matching the diameter of the cylinders forming section 106. In an exemplary configuration, transition cylinder 104 may have a midpoint diameter of thirteen feet and have an eighteen inch thick wall. Transition cylinder 104 as well as each of the cylinders in portion 106 of concrete base support 100 representatively illustrated as cylinders 142, 144, 146 are formed of ultra high performance fiber reinforced concrete. In an exemplary configuration, the ultra high performance fiber reinforced concrete may employ steel fiber as the fiber component of the concrete. In other embodiments, other fibers comprise of other materials, now known or later developed, may be utilized.

As previously referenced, each cylinder of section 106, representatively illustrated as cylinders 142, 144, 146, of concrete base support generally 100 is constructed from ultra high performance fiber reinforced concrete and may employ steel fiber for reinforcement. In an exemplary configuration, seven cylinders each fifteen feet tall may be stacked to produce a section 106 which is one hundred five feet tall.

Following assembly of section 106 of concrete base support 100, an additional cylinder 108 preferably is affixed to the top most cylinder of portion 106. Top most cylinder 108 has a bottom portion configured to mate with the top cylinder of portion 106 and a top surface that provides a mounting surface for representative generator 120. In addition, there is provided an anchoring ring to secure one end of a post tensioning cable assembly that extends per the present subject matter from such anchoring ring to a corresponding anchor at platform 112.

Once each of the various cylinders have been stacked and respectively glued into place, a cable 110 is passed through the hollow center of each of the stacked cylinders, secured at the anchor ring at the top of the string and at the anchor associated with platform 112 (i.e., at the bottom of the string) and tightened, thereby providing an internal vertical post tensioning system to assist in securing each of the respective cylinders.

Figure 2:
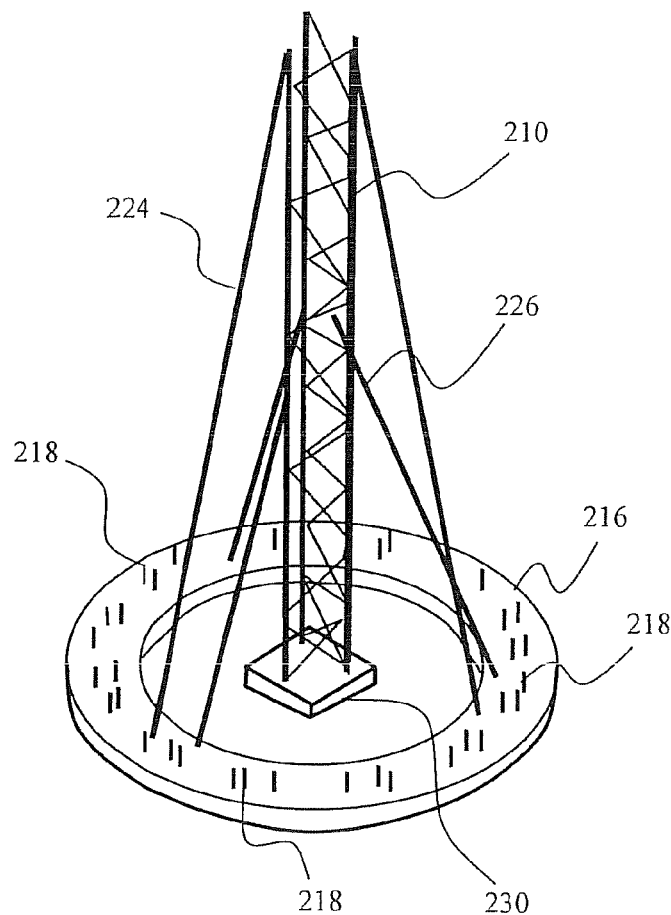
FIG. 2 illustrates a portion of a lower section of the concrete base support in accordance with a exemplary embodiment of present subject matter, illustrating a temporary support tower, guy wires, and circular concrete base support.

With reference now to FIGS. 2-19, an exemplary embodiment of the present base support for wind-driven power generators will be described. As may be seen in FIG. 2, a concrete base support and temporary tower construction may be seen that is similar, in many respects, to the previously described embodiment. As illustrated in FIG. 2, there is provided a concrete base 216 including embedded therein a number of anchor elements 218. Concrete base 216 may be poured in place and requires minimal or nor excavation. In an exemplary configuration, concrete base 216 may be sixty feet in diameter and may be provided as a shallow foundation extending just below the frost line, perhaps two to three feet in depth.

A second concrete base support 230 may be rectangular and centrally positioned within an open space within the circular concrete base 216. Concrete base support 230 is large enough to provide support for temporary tower 210 which may be held in position by one or more guy wires 224, 226. It should be appreciated that while the present construction permits removal of tower 210, such tower may, nevertheless, be retained for other purposes including providing support for conductive cables associated with the wind generator, for access to the central portion of the tower above transition piece 312 or for other purposes not directly related to the tower construction.

Figure 3:
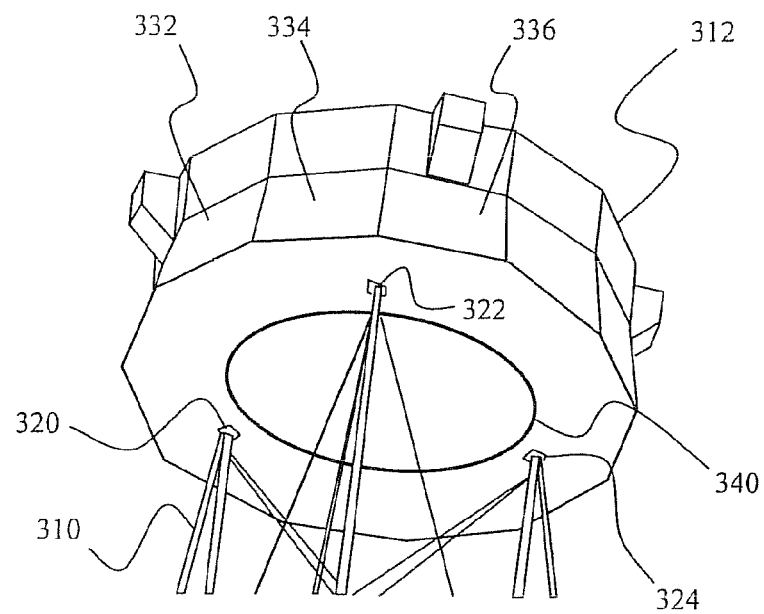
FIG. 3 is an enlarge perspective view of the top portion of the temporary tower illustrated in FIG. 2 with a precast concrete transition piece placed thereon.

Referring now to FIG. 3, there is seen an enlarge perspective view of the top portion of temporary tower 310 illustrated in FIG. 2 with a precast concrete transition piece 312 placed thereon. Transition piece 312 may be raised into position using a crane or other suitable mechanisms and is placed on flat pads 320, 322, 324 secured to the tops of vertical sections of tower 310. Transition piece 312 simply sits in place and is more securely positioned by placement of staves and other securing devices as will be explained more fully later.

Transition piece 312 is constructed with as a multifaceted precast concrete construction to include a number of facets 332, 334, 336, where the number of facets is equal to the number of staves to be positioned about the perimeter of the transition piece 312. It should further be noticed that an elliptical aperture 340 is provided through the central portion of transition piece 312 and provides a passage way through transition piece 312. Elliptical aperture 340 provides for the removal of an elongated sealing plate as will be more fully described later.

Figure 4:
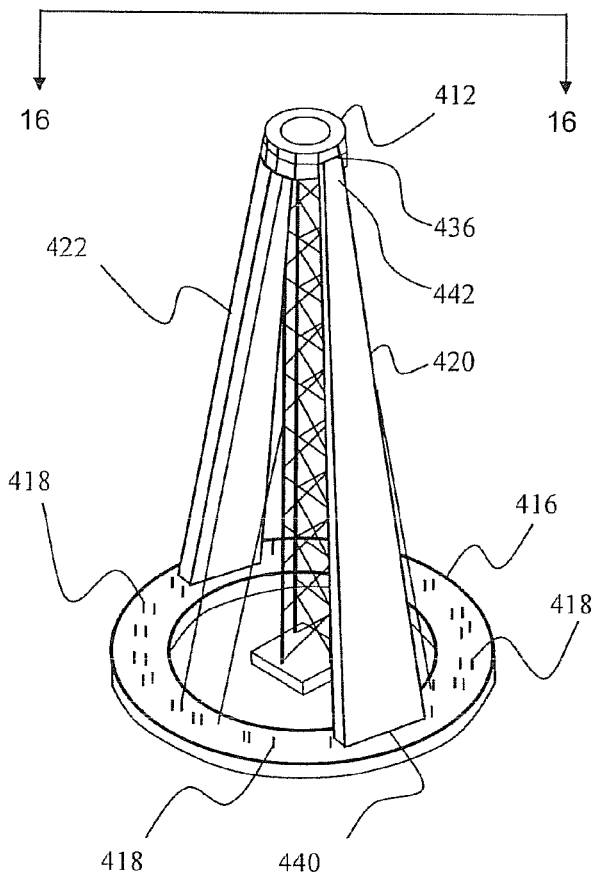
FIG. 4 illustrates the placement of a first pair of staves positioned in balanced relationship on opposite sides of the transition piece.
Figure 5:
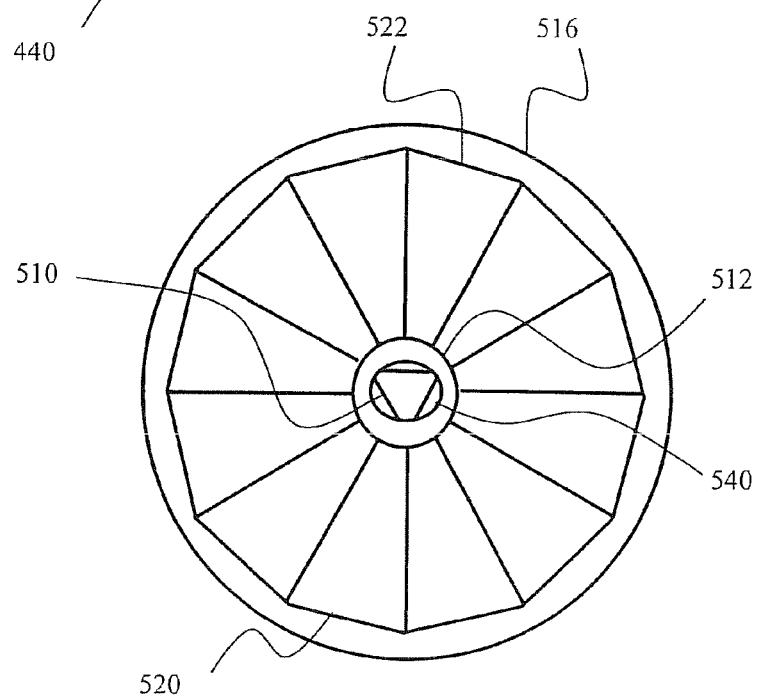
FIG. 5 is a top view taken from line 16-16 of FIG. 4 showing a completed skirted base structure.

With reference now to FIGS. 4 and 5, it will be seen that a number of pairs of staves 420, 422 are positioned with a wider base portion 440 resting on concrete base 416 and a narrower top portion 432 simply leaning against a correspondingly sized facet 436 of transition piece 412. Methods and apparatus for the manufacture of staves 420, 422 will be discussed in detail below with reference to FIGS. 19-23. Base portion 440 may be secure against radial and lateral movement by attachment to one or more anchor elements 418. FIG. 5 illustrates a top view taken from line 16-16 of FIG. 4 showing a completed skirted base structure including concrete base 516, plural pairs of staves 520, 522 positioned at top portions thereof in contact with facets of transition piece 512. Also illustrated is elliptical aperture 540 exposing portions of temporary tower 510.

Figure 6:
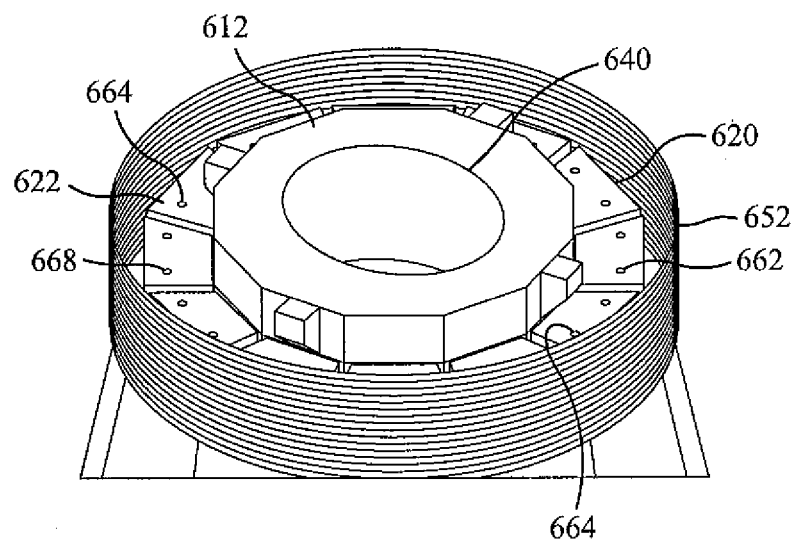
FIG. 6 illustrates a top perspective view of the precast transition piece with all stays in place and banded around with a corrugated metal collar.

FIG. 6 illustrates a top perspective view of the precast transition piece 612 with all staves 620, 622 in place and banded around with a corrugated metal collar 652. Elliptical aperture 640 is also illustrated providing a passageway through transition piece 612. A number of additional features of transition piece 612 are more clearly illustrated in FIG. 6 including a number of conduits 662, 664, 666, 668, the ends of which may be seen exposed on the ends of staves 620, 622. Conduits 662, 664, 666, 668 extend, in certain embodiments, through the length of staves 620, 622. In certain other embodiments, conduits 662, 664, 666, 668 may extend only a certain way down the length of staves 620, 622 to then turn and join with other conduits to form a U-shaped conduit from the top portion the individual stave to emerge as separate legs of the U-shape in the same or, possibly adjacent stave. In assembled form, the conduits provide a passage way for a metallic strand that may be threaded through the conduits to provide strengthened assembly of the various tower components. As will be explained further later, the metallic strands may be extended through further conduits provided in further tower portions to further assist in securing the tower components together.

Figure 7:
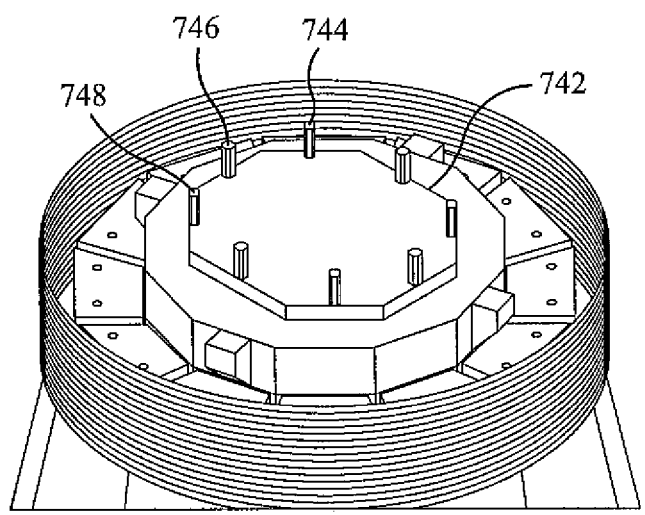
FIG. 7 illustrates a view similar to that of FIG. 6 but including a sealing plate that forms a portion of a tower hydraulic lifting mechanism.

Referring to FIG. 7, it will be noticed that the illustration is substantially identical to that of FIG. 6 with the addition of a metallic plate 742 covering elliptical aperture 640 (FIG. 6). Metallic plate 742 may be constructed of steel and has provided on the top portion thereof a number of standoffs 744, 746, 748 that are provided as support for a lifting plate to be described later. It should be noticed that metallic plate 742 is constructed to have a length and a width such that the width is narrower than the longer length of the elliptical aperture 640 yet the width is wider than the narrower width of the elliptical aperture 640. In this way, metallic plate 742 may be turned so that it will pass through elliptical aperture 640 for removal as an optional final portion of the tower erection process.

Figure 8:
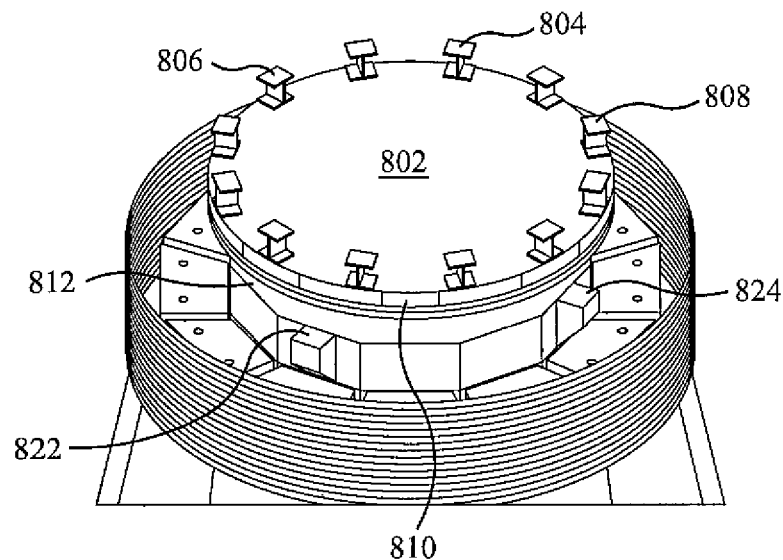
FIG. 8 illustrates a view similar to that of FIG. 7 but including a tower lifting plate.

FIG. 8 illustrates a view similar to that of FIG. 7 and further illustrates a tower lifting plate 802. Positioned around the perimeter of lifting plate 802 are a number of pedestals 804, 806, 808. Pedestals 804, 806, 808 generally correspond to portions of an I-beam and include a flat top surface configured to interface with end edge of a steel cylindrical tower portion and to lift the steel cylindrical tower portion in place using air pressure as will be described more fully later. In conjunction with the object of lifting the steel cylindrical tower portion using air pressure, a sealing ring 810 is provided around the outer perimeter of lifting plate 802 that functions in combination with the inner surface of one or more precast concrete tower sections to provide a substantially air tight seal.

Figure 9:
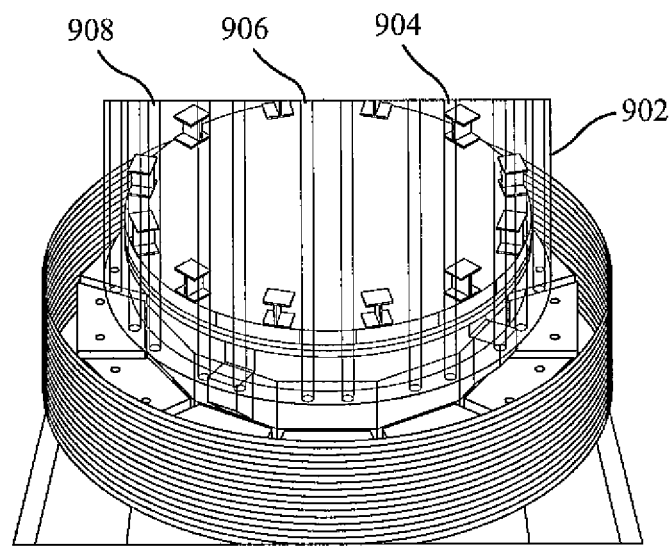
FIG. 9 illustrates a view similar to that of FIG. 8 and including illustration of a first precast concrete tower section shown partially in phantom to better illustrate aspects of the internal construction.

With reference to FIG. 9, there is illustrated a view similar to that of FIG. 8 and further illustrating a first precast concrete tower section 902 shown partially in phantom to better illustrate aspects of the internal construction. As will be noticed from FIG. 9, there are a number of conduits 904, 906, 908 provided within the wall of the precast concrete tower section 902. Conduits 904, 906, 908 are positioned to cooperate with conduits 662, 664, 666, 668 incorporated into staves 620, 622 (FIG. 6) and provide guides through which metallic threads may be passed to assist in securing the various tower components together. As may be seen most clearly in FIG. 9, precast concrete tower portion 902 is sized to fit over lifting plate 802 and is supported in place by a number of corbels or support blocks 822, 824 integrally incorporated into transition piece 812 and radially extending from the perimeter thereof, as best seen in FIG. 8.

Figure 10:
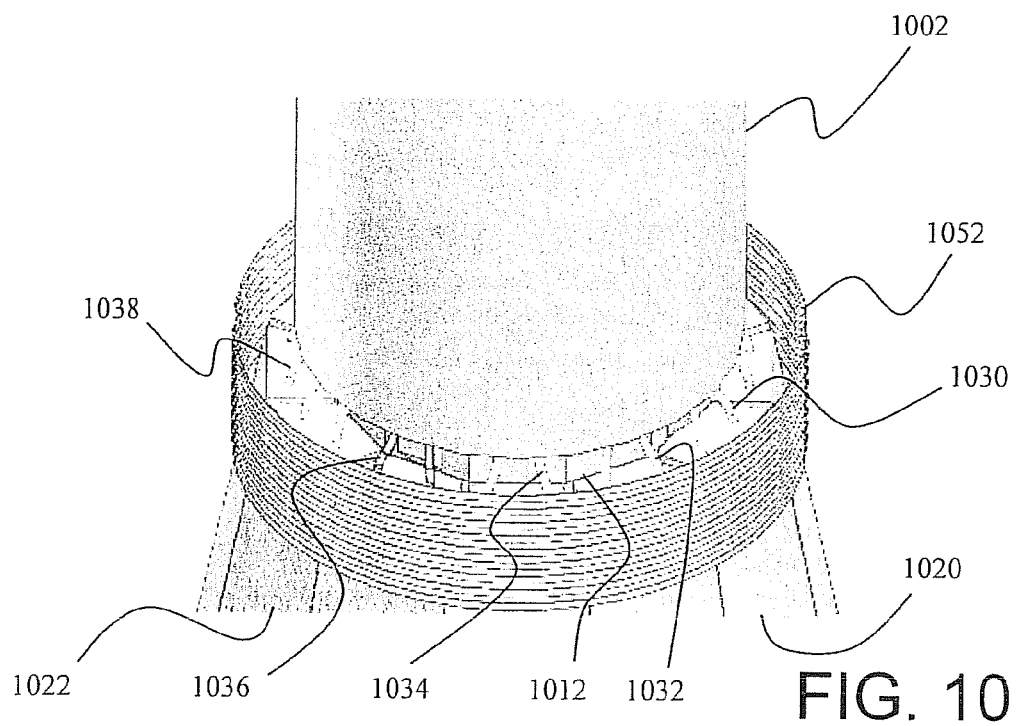
FIG. 10 illustrates coupling of ducts within the staves and precast concrete tower section to provide passageways for securing strands.
Figure 11:
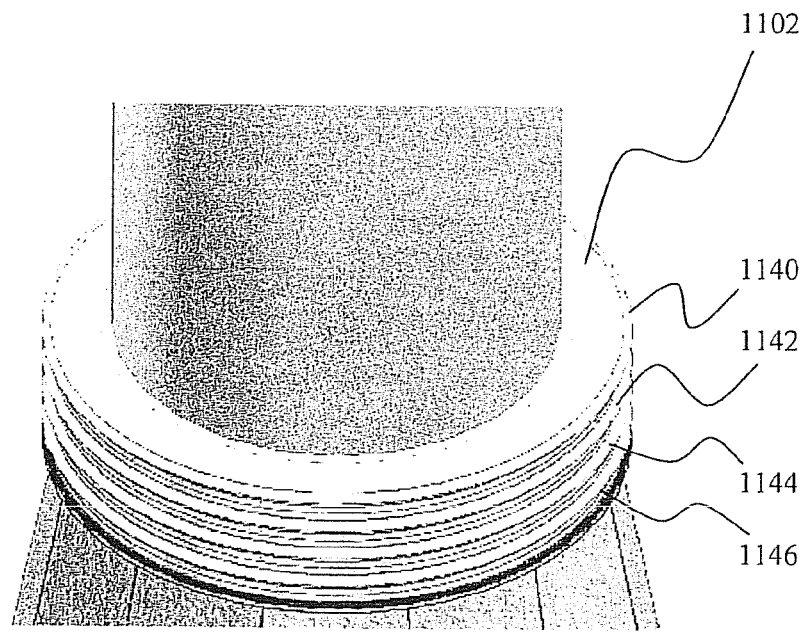
FIG. 11 illustrates sealing and circumferential clamping of the joint between the first section of precast concrete tower portion and the precast transition piece.

With reference now to FIG. 10 there is illustrated a first precast concrete tower section 1002 sitting in place on top of transition piece 1012. Coupling ducts 1030, 1032, 1034, 1036, 1038 are installed to couple ducts within the staves 1020, 1022 and precast concrete tower section 1002 to provide passageways for securing metallic strands. Referring now to FIG. 11, it will be seen that following placement of coupling ducts 1030, 1032, 1034, 1036, 1038, the space enclosed by corrugated metal band 1052 (FIG. 10) is filled with concrete 1102 and surrounded by a number of circumferential clamps 1140, 1142, 1144, 1146 configured to place the poured concrete filled corrugated metal band 1052 in compression.

Figure 12:
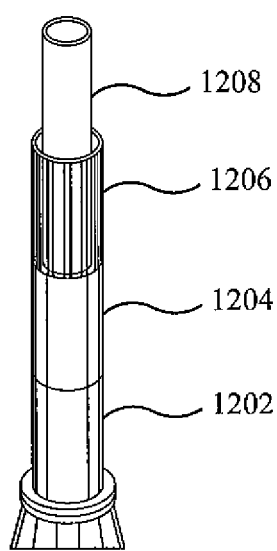
FIG. 12 illustrates, partially in phantom, the stacking of additional precast concrete tower sections and the insertion into the stacked concrete sections of a steel tower section.

With reference now to FIG. 12, it will be seen that a number of precast concrete cylindrical tower sections 1202, 1204, 1206 may be stacked one upon another to extend the height of the tower. Each section may include conduits as previously illustrated as conduits 904, 906, 908 in FIG. 9 and shown in phantom in tower section 1206 of FIG. 12. It should be appreciated that while three precast concrete sections 1202, 1204, 1206 are illustrated in FIG. 12, such number of sections is exemplary only. In practice the number of sections may generally vary from one to four depending on desire final height. It should also be noted that while the present disclosure is directed primarily to the provision of precast concrete tower sections, such is not a limitation of the present subject matter in that these sections may be constructed of other materials including steel.

After the desire number of precast concrete tower sections have been stacked, a final cylindrical steel section 1208 is positioned within the stacked concrete sections and lowered so as to contact the plural pedestals 804, 806, 808 secured to the upper surface of lifting plate 802 (FIG. 8). Cylindrical steel section 1208 includes a ringed tooth engagement mechanism (not separately illustrated) on the lower portion of cylindrical steel section 1208 so that when cylindrical steel section 1208 is raised and later rotated the mechanism meshes with a locking tooth mechanism installed on the top portion of the top concrete tower section.

Figure 13:
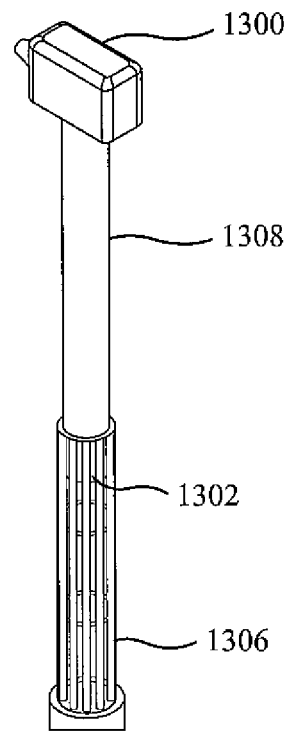
FIG. 13 illustrates an exemplary tower in accordance with present technology in a fully extended position and supporting a wind generator.
Figure 14:
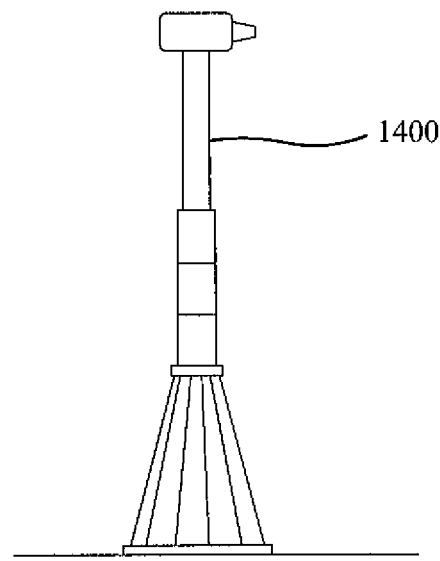
FIG. 14 illustrates a completed tower construction supporting a wind generator but omitting the normally accompanying turbine blade assembly.

Referring now to FIG. 13, it will be seen that a wind powered generator 1300 may be mounted to the top of cylindrical steel section 1308 and the combination raised to a final operating position by forcing compressed air into the space between the end of the lower most precast concrete tower section 1306 and the lifting plate 1302. Those of ordinary skill in the art will appreciate that the normally required wind turbine blades associated with wind generator 1300 may be attached to the generator prior to raising the assembly. Such turbine blades are not presently illustrated. FIG. 14 illustrates the assembled tower in its fully extended position.

Figure 15:
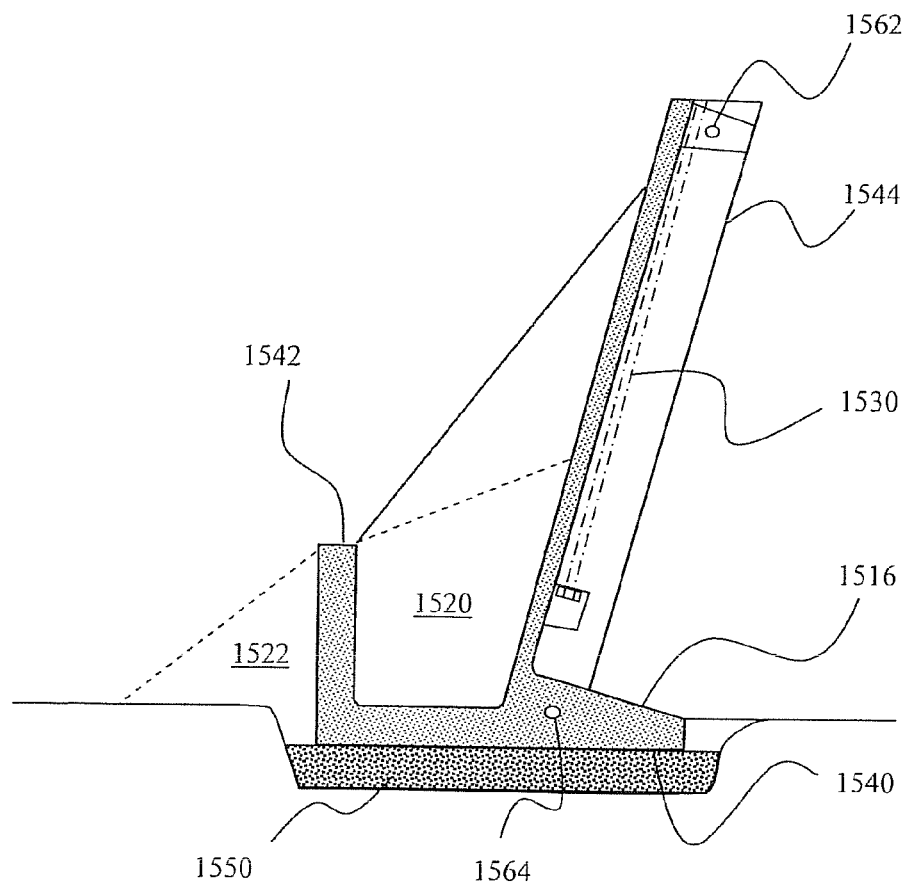
FIG. 15 is a cross section of a portion of a precast base including ballast fill and stave anchoring features in accordance with certain exemplary embodiments of the present technology.
Figure 16:
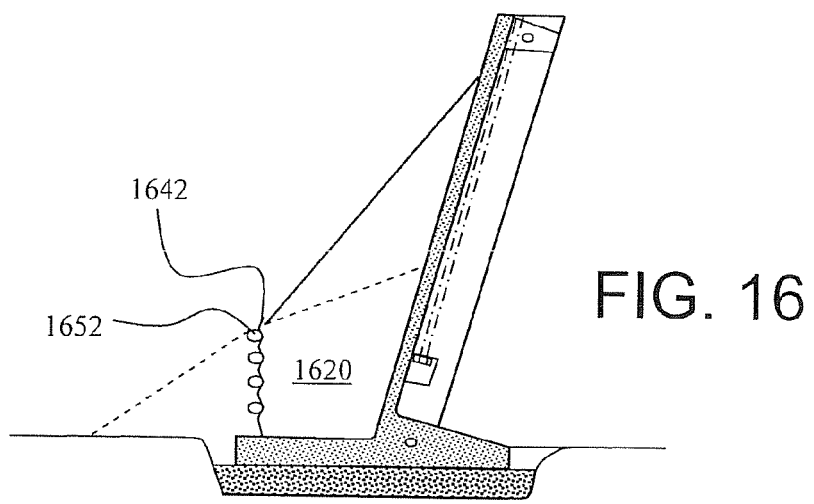
FIG. 16 illustrates a cross section of an alternate configuration of the precast base structure that is identical to that of FIG. 15 except that the upstanding wall section has been replaced with a separated corrugated metal structure in accordance with certain other exemplary embodiments of the present technology.

With reference now to FIG. 15 there is illustrated a cross section of a portion of a precast concrete base 1516 including ballast fill 1520, 1522 and stave anchoring features 1530 in accordance with certain exemplary embodiments of the present technology. As illustrated in FIG. 15, a feature of the present subject matter resides in the ability of the base support to be provided with minimal excavation requirements. As such, relatively shallow foundations placed just below the frost line for the particular tower location. Generally this will be two to three feet deep. This feature of being able to provide a poured I place circular strip footing as illustrated in FIG. 2 may be extended to a precast concrete sectionalized base as illustrated in FIG. 15. As shown in FIG. 15, base 1516 is provided with a flat lower portion 1540 and includes a radially outward outer upstanding wall 1542 and includes integral formed stave portions 1542. Integral stave portions 1542 include anchoring features 1530 corresponding to the metallic strand receiving conduits previously discussed with respect to FIG. 6 and conduits 662, 664, 666, 668. A plurality of sections corresponding to base 1516 may be placed in a circular trench containing compacted material 1550 which, in an exemplary configuration, may be one to six feet thick. Each of the plurality of sections may be secured together by metallic threads threaded through integral conduits 1562, 1564 and the entire assembly may be provided with additional ballast 1520, 1522 in the form of, for example, a stone fill. FIG. 16 illustrates an alternate configuration of the precast base structure that is identical in every way to that of FIG. 15 except that upstanding wall section 1542 has been replaced with a separated corrugated metal structure 1642 and a series of post tensioning bands 1652 which function to retain ballast.

Figure 17:
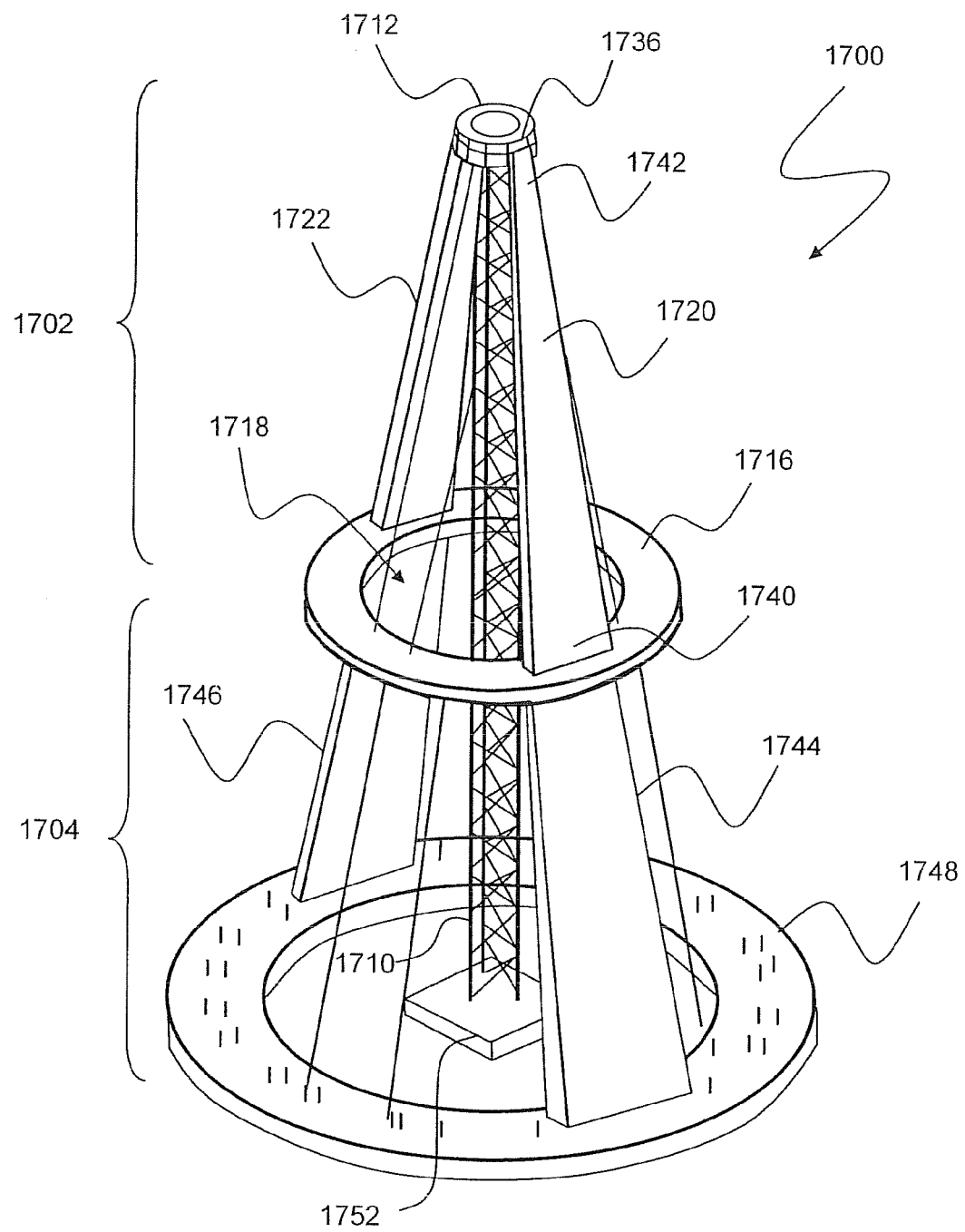
FIG. 17 illustrates preliminary construction of a multistage tower base for use with larger capacity turbines and higher towers.

Referring now to FIG. 17, there is illustrated a multi-stage tower base generally 1700 designed to provide support, for example, for larger capacity turbines positioned at heights higher than single stage tower supports. As seen in FIG. 17, a top portion generally 1702 of multi-stage tower base 1700 is constructed in a manner similar to that shown and described in conjunction with FIGS. 4 and 4. Thus, in FIG. 17 it will be seen that a number of pairs of staves 1720, 1722 are positioned with a wider base portion 1740 resting on concrete base 1716 and a narrower top portion 1742 simply leaning against a correspondingly sized facet 1736 of transition piece 1712.

In a manner similar to that illustrated in FIG. 5, a completed top portion 1702 of skirted tower base 1700 includes concrete base 1716 and plural pairs of staves similar to staves 1720, 1722 positioned with top portions thereof in contact with other facets of transition piece 3712 and bottom portions resting on concrete base 1716. In exemplary configurations, concrete base portion 1716 may be either pre-cast or cast in place.

A lower portion generally 1704 of multi-stage tower base 1700 is similar to the top portion 1702 and supports concrete base 1716 by way of plural pairs of staves exemplarily illustrated as staves 1744, 1746. A central supporting tower 1710 rests on concrete support 1752 and extends from concrete support 1752, through a central opening 1718 in concrete base 1716, and upward to support transition piece 1712. As in previous embodiments, central tower 1710 may correspond to a temporary or permanent structure.

In an exemplary embodiment, the upper portion 1702 of tower base 1700 may incorporate about six pairs or twelve staves while lower portion 1704 may incorporate nine or ten pairs or eighteen to twenty staves. Of course, different numbers of staves may be incorporated in both the upper and lower portions of tower base 1700 depending on construction requirements for a particular embodiment, or depending on particular design criteria for given customers.

Figure 18:
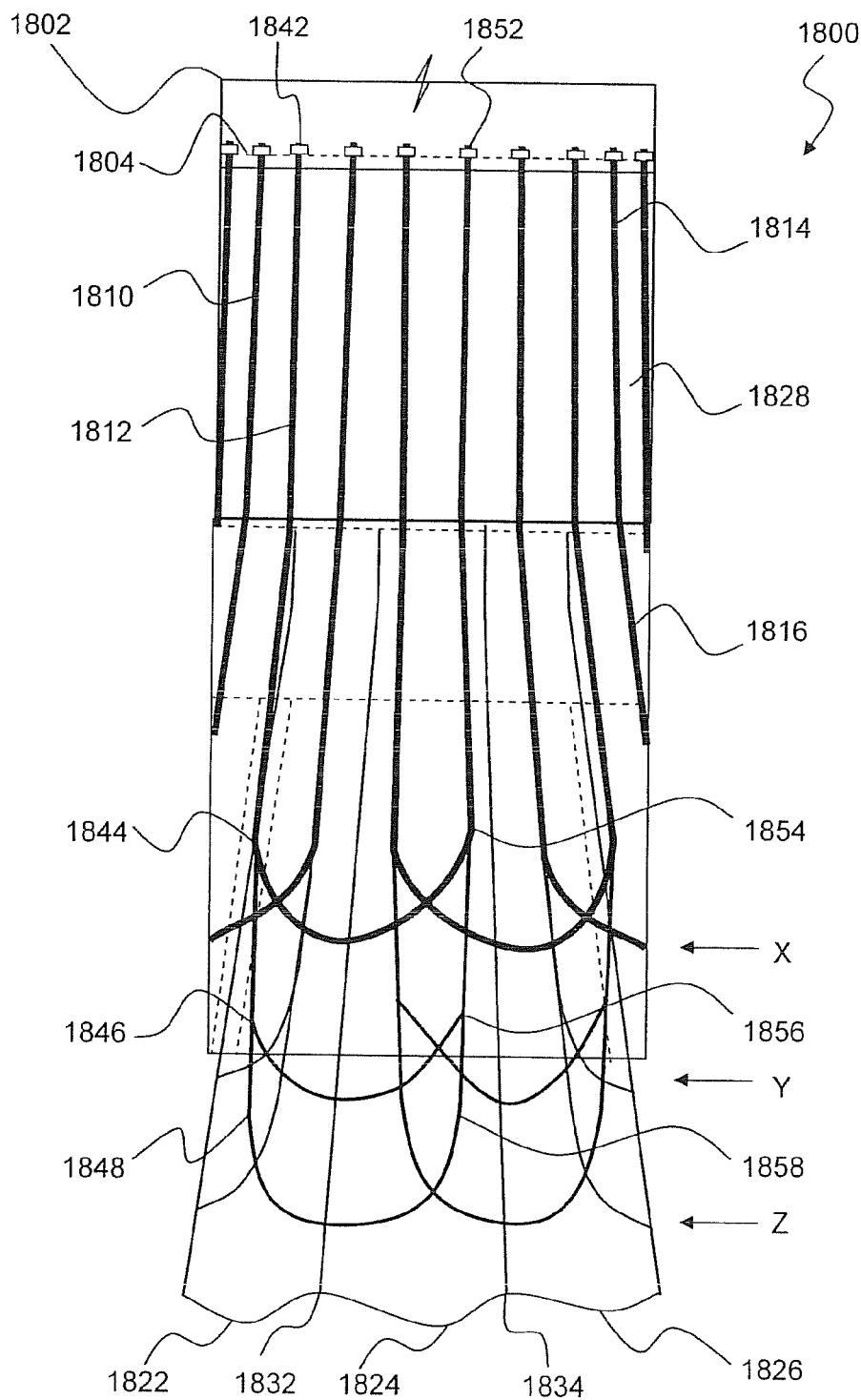
FIG. 18 illustrates an exemplary implementation of "U" shaped tendons to provide multiple joint crossing and enhanced stave retention.

With reference now to FIG. 18, there is illustrated an exemplary implementation of "U" shaped tendons to provide multiple joint crossing and enhanced stave retention. The illustrated tower section corresponds to a number of staves 1822, 1824, 1826 configured to support a concrete ring generally 1828, which staves are secured together at least in part by a number of individual tendons 1810, 1812, 1814, 1816. The assembly is designed to support a cylindrical steel tube section 3802 with the assistance of tube support structure 1804. An upper portion of steel tube 1802 (not shown) may be configured as well understood by those of ordinary skill in the art to support a wind turbine.

Staves 1822, 1824, 1826 abut each other at joints 1832, 1834, and are held in place by tendons 1810, 1812, 1814, 1816. In accordance with present technology, tendons 1810, 1812, 1814, 1816 are configured to pass through tubes cast into concrete ring 1828 and each of the staves 1810, 1812, 1814, 1816 as "U" shaped formations crossing adjacent staves at multiple locations generally designated along lines X, Y, and Z.

An exemplary tendon 1842 is secured at the top of concrete ring 1828 and passes through tubes embedded in concrete ring 1828. Such exemplary tendon 1842 then passes through similar tubes embedded in stave 1822 until it reaches a point 1844 where the tendon is divided into a first portion that loops around to point 1854 and exits at point 1852 again at the top of concrete ring 1828. A second portion of tendon 1842 continues on to point 1846 where it again is split, with one portion going to point 1856 and a second portion going on to point 1848. The tendon portion advancing to point 1848 passes through tubes embedded in both staves 1822 and 1824, and then joins up with the remaining portions, including those that pass through tubes in both staves 1822 and 1824 between points 1846 to 1856 and 1844 to 1854. Similar separating and rejoining of the several other tendons occurs with all of the individual staves.

In accordance with present technology, such separating of the individual tendons into multiple portions provides for enhanced coupling of the staves at multiple points along joints 1832, 1824. It should be appreciated that while present discussion describes tendons separating into three portions, each coupling adjacent staves at three separate points, the present subject matter is not so limited; therefore, the tendons may be separated into three, four or five or more portions, each crossing at separate points to secure plural staves.

Referring now to FIGS. 19-27, exemplary methodology and apparatus for the manufacture of precast concrete structures used in the construction of a base support will be described. In FIGS. 19-23, a concrete form may be seen that is used to cast concrete precast staves, similar to staves 420 and 422 illustrated in FIG. 4. The concrete form is used to cast pre-stressed injection mold concrete staves in a manner that replicates the accuracy, precision, and finish of known match-casting techniques. Precast concrete staves molded using the techniques and apparatus described herein have minimized defects in the surfaces of the stave, allowing for accurate matching with other structures used for example to construct the subject base support, including other staves or transition pieces of the base support, such as transition piece 312 shown FIG. 3. In such manner, the various structural components of the base support may be secured together using adhesives as opposed to grouted joint techniques.

It should be noted that the present methodologies may be practiced in conjunction with the fabrication of other concrete pieces involving fabrication of structures where the advantages obtained for the concrete pieces herein described are desired. Therefore, the present methodologies are not intended as being limited to production only of the concrete pieces herein disclosed or otherwise referenced.

Figure 19:
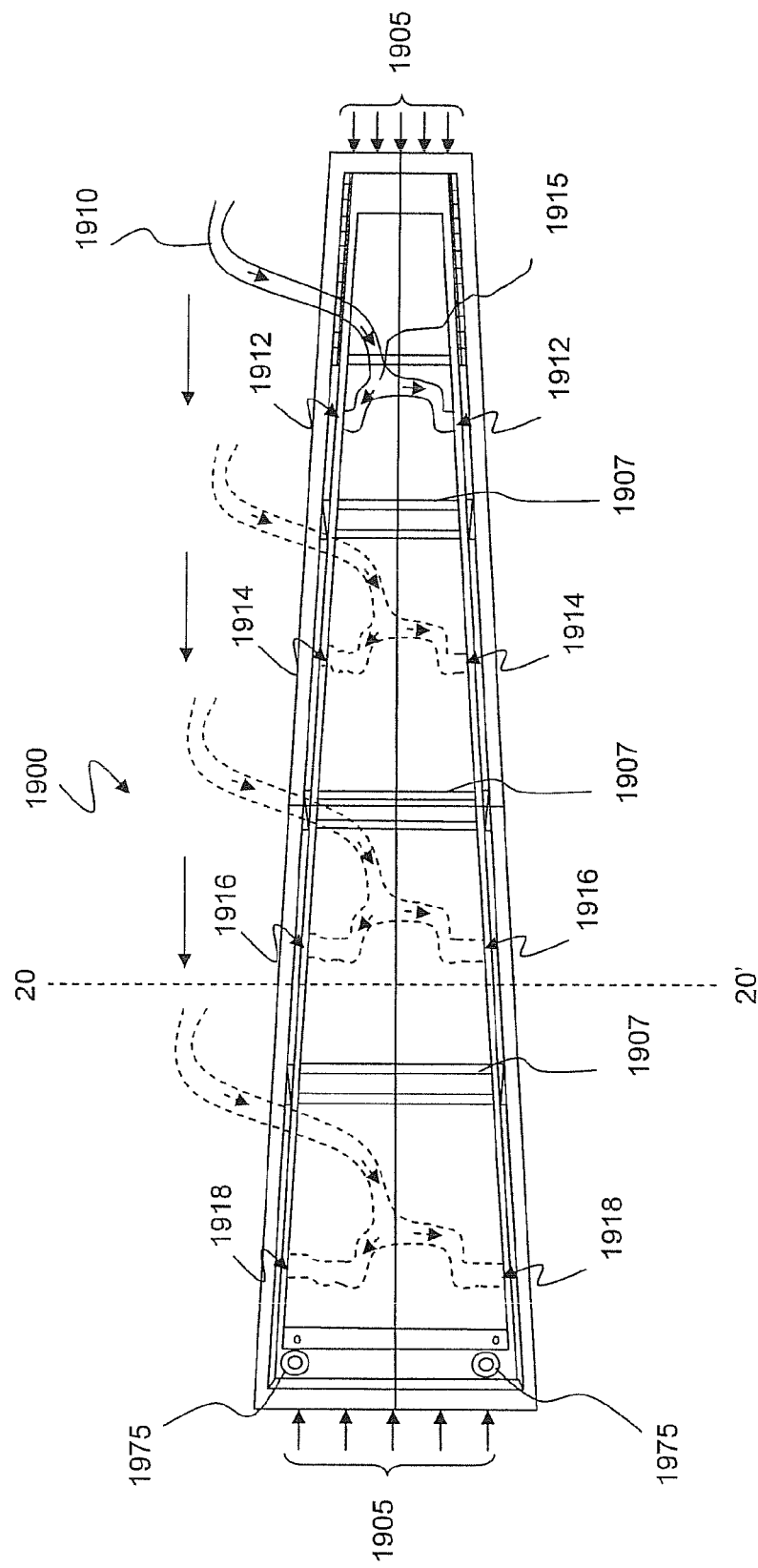
FIG. 19 illustrates a top plan view of an exemplary concrete form used to cast staves for use in exemplary embodiments of the present technology.

With reference now to FIG. 19, a top plan view of an exemplary concrete form generally 1900 used to manufacture pre-stressed injection mold concrete staves is illustrated. Arrows 1905 indicate locations for anchors for pre-stressing tendons placed in the concrete stave during its formation. The concrete form 1900 forms an almost completely enclosed cavity into which concrete is pumped from concrete feed yoke 1910. Once the concrete form 1900 has been filled with concrete, the casting cures and hardens inside the cavity formed by the concrete form 1900 to form a concrete stave. Concrete form 1900 may also include various conduits 1907 or other structural components that are cast into the stave. Methodology for casting such conduits or structural components into the stave will be discussed in more detail with reference to FIG. 24 and FIGS. 24A-24D.

As will be understood by those of ordinary skill in the art without additional discussion, concrete feed yoke 1910 may be connected at one end to a concrete supply source (not shown). The concrete supply source may be configured to provide a supply of any type or mix of concrete desired for injection into concrete form 1900. For example, such concrete supply source may provide a supply of a self-consolidating concrete mix for injection into the concrete form 1900. As illustrated in FIG. 19, concrete feed yoke 1910 may for example include a Y-joint generally 1915 to split the flow of concrete to opposite ends of the concrete form 1900. Concrete feed yoke 1910 injects concrete into the concrete form 1900 at any of a plurality of concrete injection ports 1912, 1914, 1916 and 1918 located in the concrete form 1900. The number of ports may be varied as desired or needed, particularly to accommodate different sized pieces being prepared per the present methodology and/or to accommodate variations in characteristics of the concrete being poured.

As indicated, the concrete feed yoke 1910 can be moved up and/or down the concrete form 1900 to inject concrete into different areas of the concrete form 1900. For example, once the area of the concrete form 1900 corresponding to injection port 1912 has been filled, the concrete feed yoke 1910 may be moved "up" the concrete form 1900 and attached to injection port 1914 to fill the area of the concrete form 1900 associated with injection port 1914. It should be understood that in the present context the direction "up" preferably refers to that end or side of the piece being poured which is relatively raised. Therefore, the ports, in certain present embodiments, could be located in spaced placements "moving" from side to side of the form 1900, rather than from end to end thereof. It should also be understood that the different areas of the concrete form are not separated by any physical separator or divider, but rather combine together to form one continuous concrete form for molding of a concrete piece, in this example, a concrete stave.

Concrete form 1900 may also have ventilation ports 1975 to allow for the escape of air when the concrete form 1900 is being filled with concrete. Ventilation ports 1975 may be any type of vent for allowing the escape of air, and may operate with or without vacuum assistance. After the concreted form 1900 has been filled with concrete, the ventilation port may be configured to be closed-off to provide a completely enclosed environment for curing of the concrete. In addition, using the teachings provided herein, those of ordinary skill in the art should appreciate that the number and location of ventilation ports 1975 may varied as desired or needed without deviating from the scope or spirit of the present technology.

Figure 20:
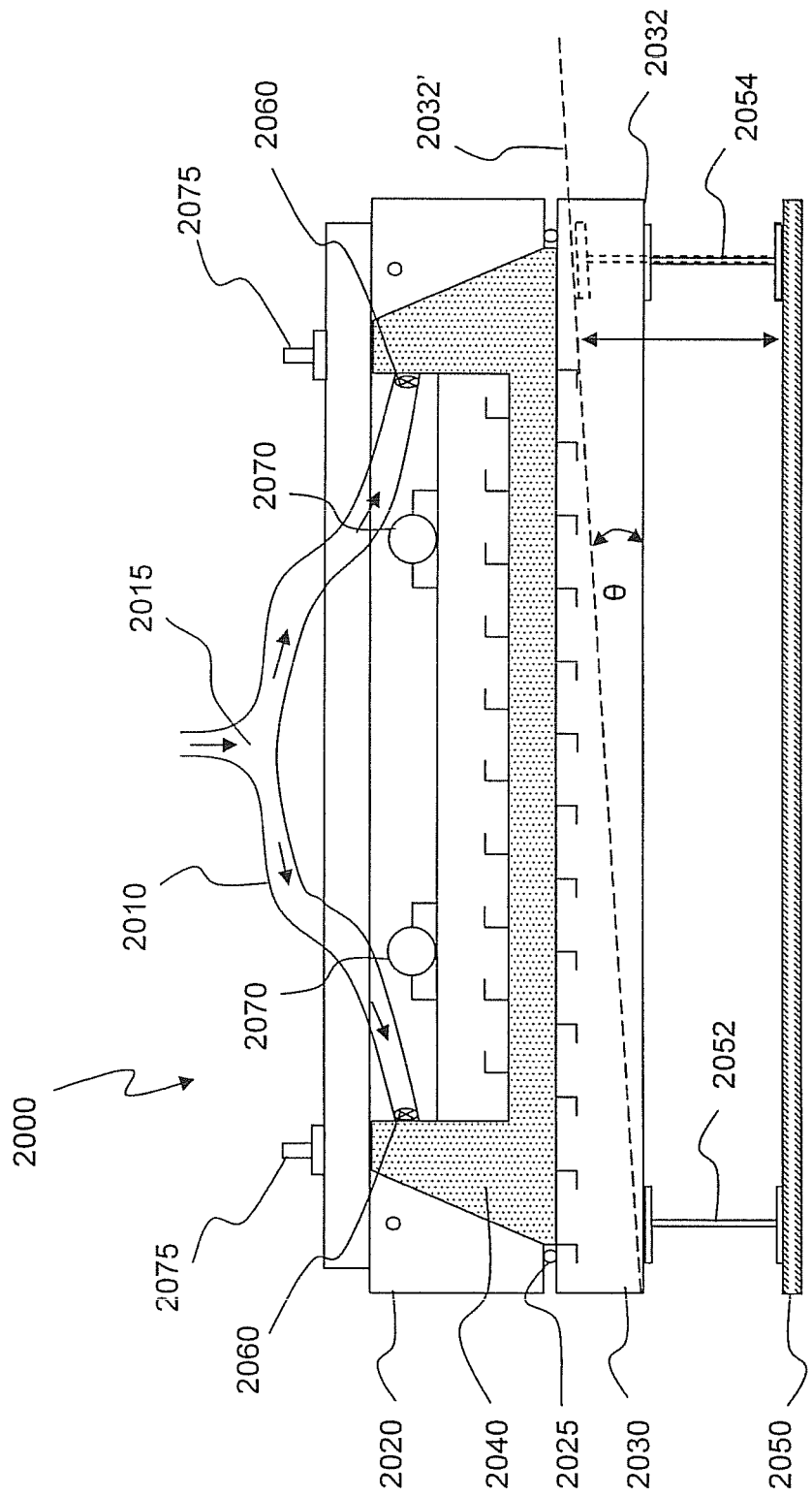
FIG. 20 illustrates a cross-sectional view of an exemplary concrete form used to cast staves for use in exemplary embodiments of the present technology, taken along section line 20-20' as shown in present FIG. 19, with dotted line representation of the concrete form being tiltable in accordance with present subject matter about a longitudinal axis of the form.

With reference now to FIG. 20, a cross-sectional view of a concrete form 2000 similar to the concrete form 1900 shown in FIG. 19 can be seen, with such cross-section taken along section line 20-20" of such FIG. 19. As illustrated, concrete form generally 2000 includes two separable pieces, in this instance an upper form 2020 and a lower form 2030. Upper form 2020 and lower form 2030 combine together to form a substantially enclosed cavity into which concrete is injected in order to form casting 2040. During the concrete injection process, upper form 2020 and lower form 2030 are preferably secured together. One present methodology for such securement is to make use of a mechanical clamping mechanism generally 2025 such as, for example, a pin joint or a bolt joint. Importantly, upper form 2020 and lower form 2030 are adapted to completely cover, with the exception of injection ports and ventilation ports 2075, the casting 2040 in the concrete form 2000.

Upper form 2020 and lower form 2030 may include structural reinforcing members so that the concrete form 2000 is self-supporting. In addition, upper form 2020 and lower form 2030 may include thermal insulation materials and/or electric heaters embedded in the bodies of the upper form 2020 and the lower form 2030, respectively. Such thermal insulation materials and/or embedded electric heaters are useful per present subject matter in assisting the concrete to cure and harden more efficiently, and with less heat loss into the ambient air. The thermal insulation materials and/or embedded heaters also reduce the amount of Portland cement needed in the concrete, which reduces the emissions. Therefore, the present concrete pouring methodologies make more efficient use of energy while also contributing less heat into the surrounding environment, for two-fold improvement involving environmental and energy concerns.

Referring still to FIG. 20, representative concrete feed yoke 2010 injects concrete (as represented by the plurality of unlabeled arrows) into concrete form 2000 through respective cut-off valves 2060 provided in the concrete form 2000 at the plurality of concrete injection ports 1912, 1914, 1916 and 1918. The cut-off valve 2060 may be a part of the concrete form 2000 itself and may be adapted to provide a tight seal for the concrete form 2000 when concrete is not being injected through the cut off valve 2060. As will be understood by those of ordinary skill in the art, valves 2060 must be adapted so that they can open and close even after concrete has cured in the area adjacent the valve 2060. It is to be understood that the present methodologies are intended to encompass variations in the specific constructions of such representative valves 2060, or even the placement thereof relative to a given feed yoke construction.

As illustrated, concrete form 2000 may also include vibrators generally 2070. Vibrators 2070 may be used (if necessary for particular concrete mixes and due to other factors), to assist concrete 2040 in filling the cavity formed by upper form 2020 and lower form 2030. For instance, vibrators 2070 may be particularly useful during troubleshooting scenarios when there is difficulty getting concrete to adequately flow into the concrete form 2000.

In FIG. 20, representative concrete form 2000 rests on supports 2052 and 2054 extending from floor or base 2050. The concrete form 2000, as illustrated, is resting so that the bottom surface 2032 of the lower form 2030 is substantially parallel with the floor or base 2050. However, in particular embodiments, the height of support 2054 (or of support 2052 and/or any other necessary supports) may be adjusted so that concrete form 2000 is tilted about a transverse axis at an angle $\theta$ so that the bottom surface 2032 of lower form is aligned along dashed line 2032' of FIG. 20. The angle $\theta$ may be any angle in the range from about 0° when the bottom surface 2032 is substantially parallel to the floor or base 2050 to about 90° when the bottom surface 2032 is substantially perpendicular to the floor or base 2050. In certain instances, it may be desirable for such angle to be greater than 90°, such as to provide desired positioning of the form and/or workpiece for other processing considerations. As will be discussed below, the tilting of the concrete form 2000 allows for the manufacture of concrete staves (or other pieces) with minimized defects in the surfaces of the stave (or other workpieces).

Figure 21:
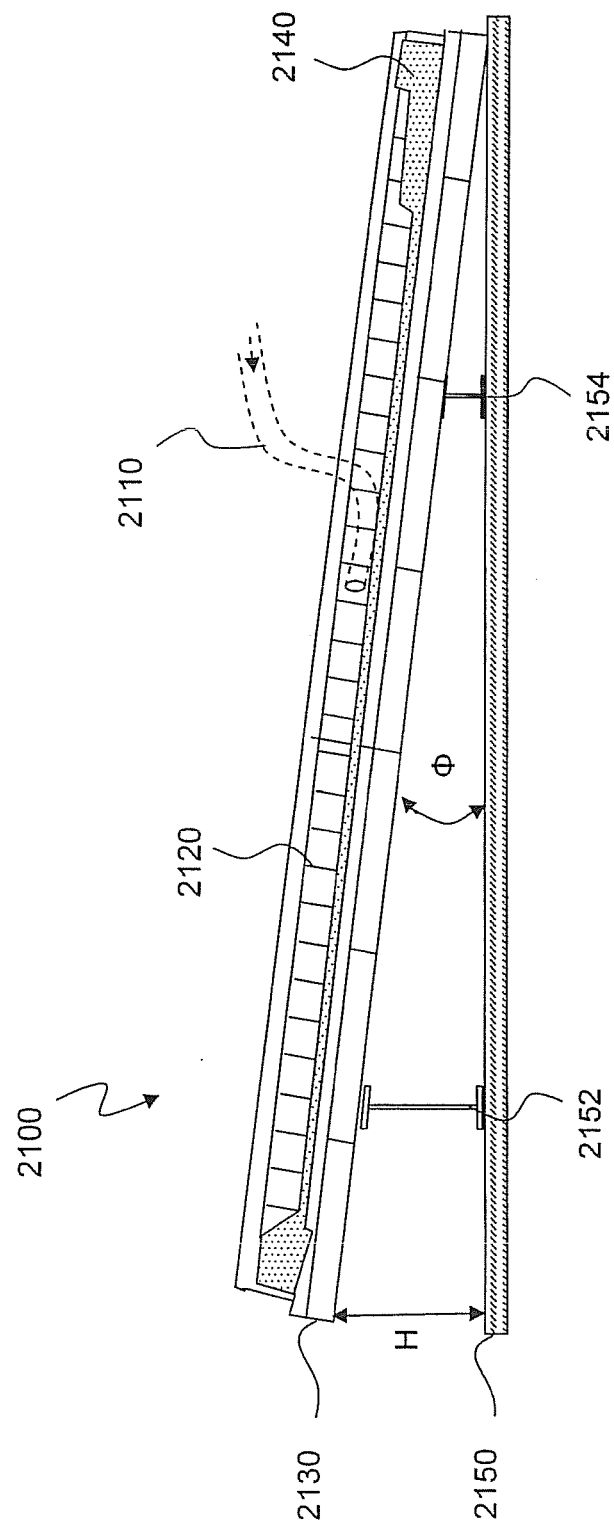
FIG. 21 illustrates a side view of an exemplary concrete form used to cast staves for use in exemplary embodiments of the present technology, with representative tilting of the concrete form relative to its longitudinal axis, in accordance with certain aspects of the present subject matter.

Referring now to FIG. 21, a side view of a concrete form generally 2100 similar to those shown in FIGS. 19 and 20 can be seen. Concrete form 2100 includes upper form 2120 and lower form 2130 that substantially enclose casting 2140. Concrete form 2100 is supported by supports 2152 and 2152, which may be positioned and configured such that concrete form 2100 is tilted about the longitudinal axis by an angle of $\Phi$. In other embodiments, the concrete form 2100 may be tilted by attaching a crane to the concrete form and lifting one end of the concrete form 2100 so that the concrete form is tiled about the longitudinal axis by an angle of $\Phi$. The angle $\Phi$ may be any angle in the range from about 0° when the bottom surface of the lower form 2130 is substantially parallel to the floor or base 2150 to about 90° (or more) when the bottom surface of the lower form 2130 is substantially perpendicular to the floor or base 2150. The only potential limit on the angle $\Phi$ is the maximum height H that can be attained for the concrete form 2100. As illustrated, as $\Phi$ increases from about 0° to about 90°, the height H of the concrete form 2100 increase. There may exist certain limitations on the height H, such as ceiling height of a manufacturing facility, that may coincidentally serve as limits on the angle Φ, particularly where stave pieces may be on the order of 90 feet in length.

As illustrated in FIGS. 20 and 21, the concrete form of the present technology may be tilted about a transverse axis, about a longitudinal axis, or about both a transverse axis and a longitudinal axis, all in accordance with the present subject matter. By injecting concrete "upwardly" into the tilted concrete form starting from the lowest elevation of the concrete form to the highest elevation, defects in the surface of a casting molded in the concrete form may be minimized.

For example, referring to FIG. 19, if the concrete form 1900 was tilted about a longitudinal axis as shown in FIG. 21 so that the portion of the concrete form 1900 corresponding to injection port 1918 was located above the portion of the concrete form corresponding to injection port 1912, concrete may first be injected at the bottom of concrete form 1900 in the area corresponding to injection port 1912. Once the area corresponding to injection port 1912 has been filled, the concrete feed yoke 1910 may be moved upward as indicated by the unlabeled arrows to injection port 1914. Once the area corresponding to injection port 1914 is filled, the concrete feed yoke 1110 may be moved even further upward as indicated by the arrows to injection port 1916. Once the area corresponding to injection port 1916 is filled, the concrete feed yoke 1910 may be moved still even further upward as indicated by the arrows to injection port 1918.

Utilizing such present technique, air pockets may be minimized in the resulting injected concrete, resulting in fewer defects on a surface or surfaces of the casting. The defects may be even further minimized by controlling the pumping rate of the concrete into the concrete form. By varying the tilt angle of the concrete form about the longitudinal and/or transverse axis, and by varying the pump rate of the concrete from the concrete yoke, an optimal surface can be attained. All such combinations of variations are intended to be encompassed by the present subject matter.

Figure 22:
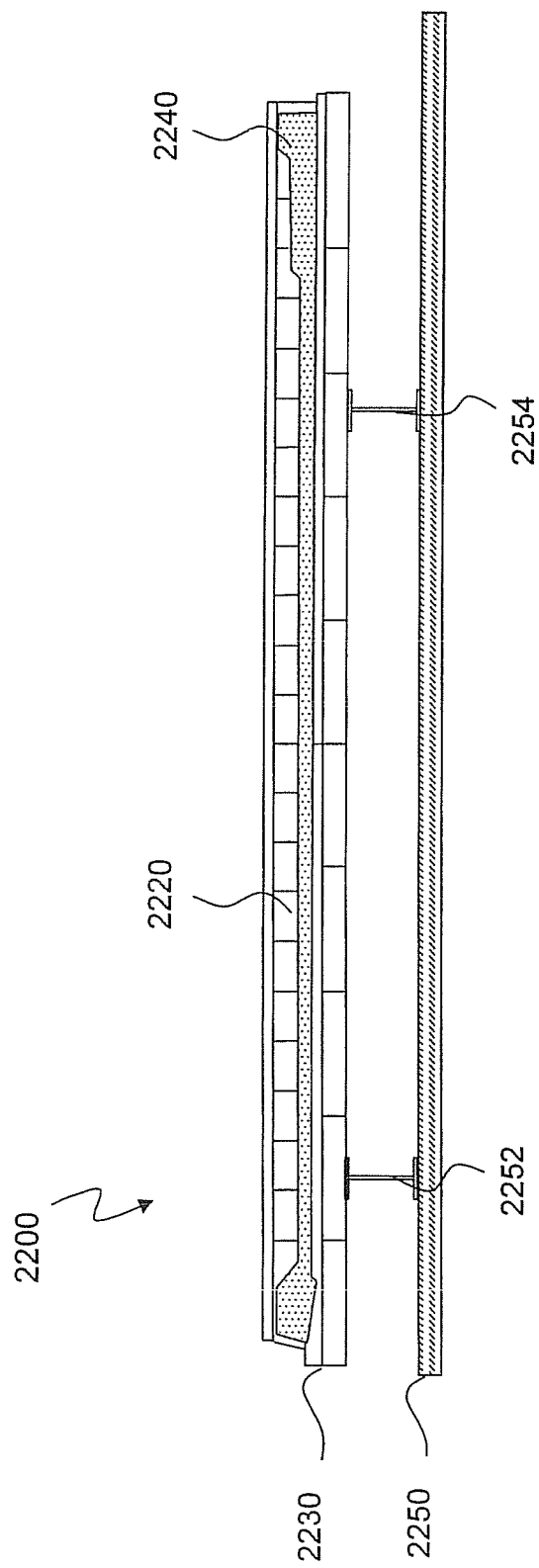
FIG. 22 illustrates a side view of an exemplary concrete form used to cast staves for use in exemplary embodiments of the present technology, with such form illustrated while situated substantially parallel with the floor.

As shown in FIG. 22, once concrete has been injected into the concrete form generally 2200 according to the methodology discussed herein, the concrete form 2200 may be arranged substantially parallel with floor or base 2250 for curing and hardening of the casting 2240. As illustrated, the supports 2252 and 2254 extending from or received on floor 2250 are configured such that the concrete form 2200 lies substantially parallel with floor 2250. A concrete form 2200 may be moved from a tilted support arrangement, such as those representatively shown in FIG. 20 and FIG. 21, to the substantially flat support arrangement of FIG. 22 through the use of any appropriate transportation mechanism, including cranes. The details of such lifting/transportation mechanisms are well known to those of ordinary skill in the art and form no particular portion of the present subject matter.

Figure 23:
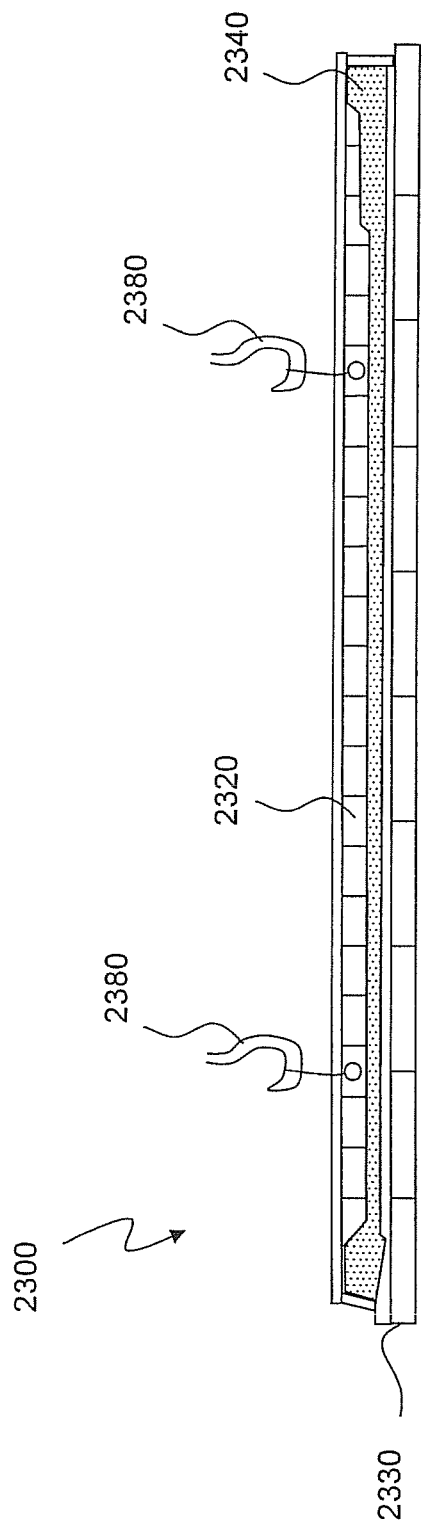
FIG. 23 illustrates a side view of an exemplary concrete form used to cast staves for use in exemplary embodiments of the present technology, and illustrating such concrete form being lifted in the air by a plurality of attachment mechanisms, all in accordance with certain aspects of the present subject matter.

As shown in FIG. 23, concrete form generally 2300 includes per the present subject matter two attachment mechanisms 2380 for securing the concrete form to a crane or other device (not shown, or discussed in detail) for lifting the concrete form 2300. As discussed earlier, upper form 2320 and lower form 2330 may each include structural reinforcement so that the concrete form 2300 may be effectively and safely transported by crane or the like from one area or location to another, such as in or about a production facility.

Figure 24:
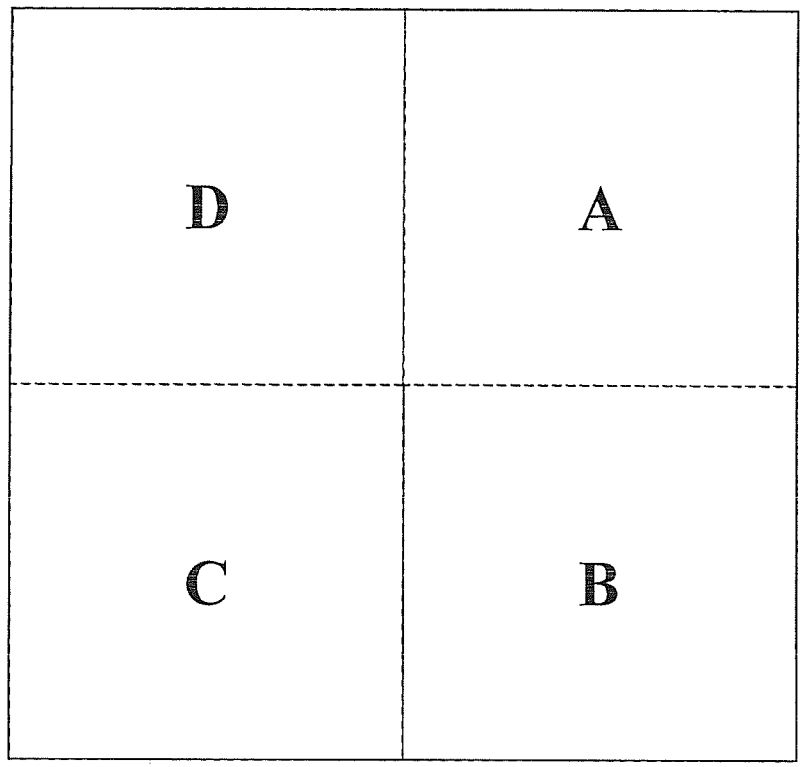
FIG. 24 illustrates a composite location key for subfigures, FIGS. 24A through 24D, which collectively illustrate an exemplary layout of a facility where concrete staves may be cast according to exemplary methodology and apparatus of the present technology.
Figure 24A:
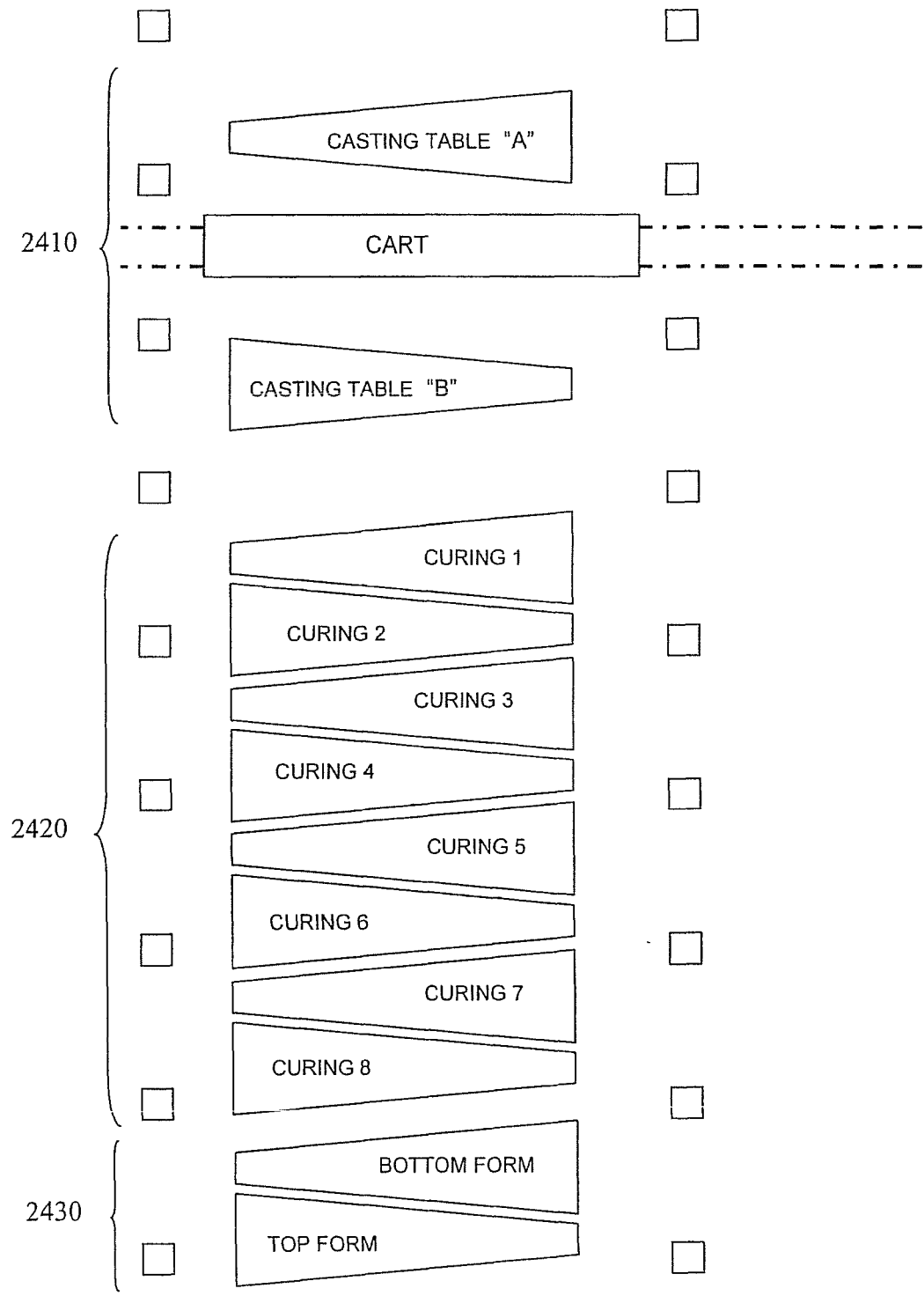
Figure 24B:
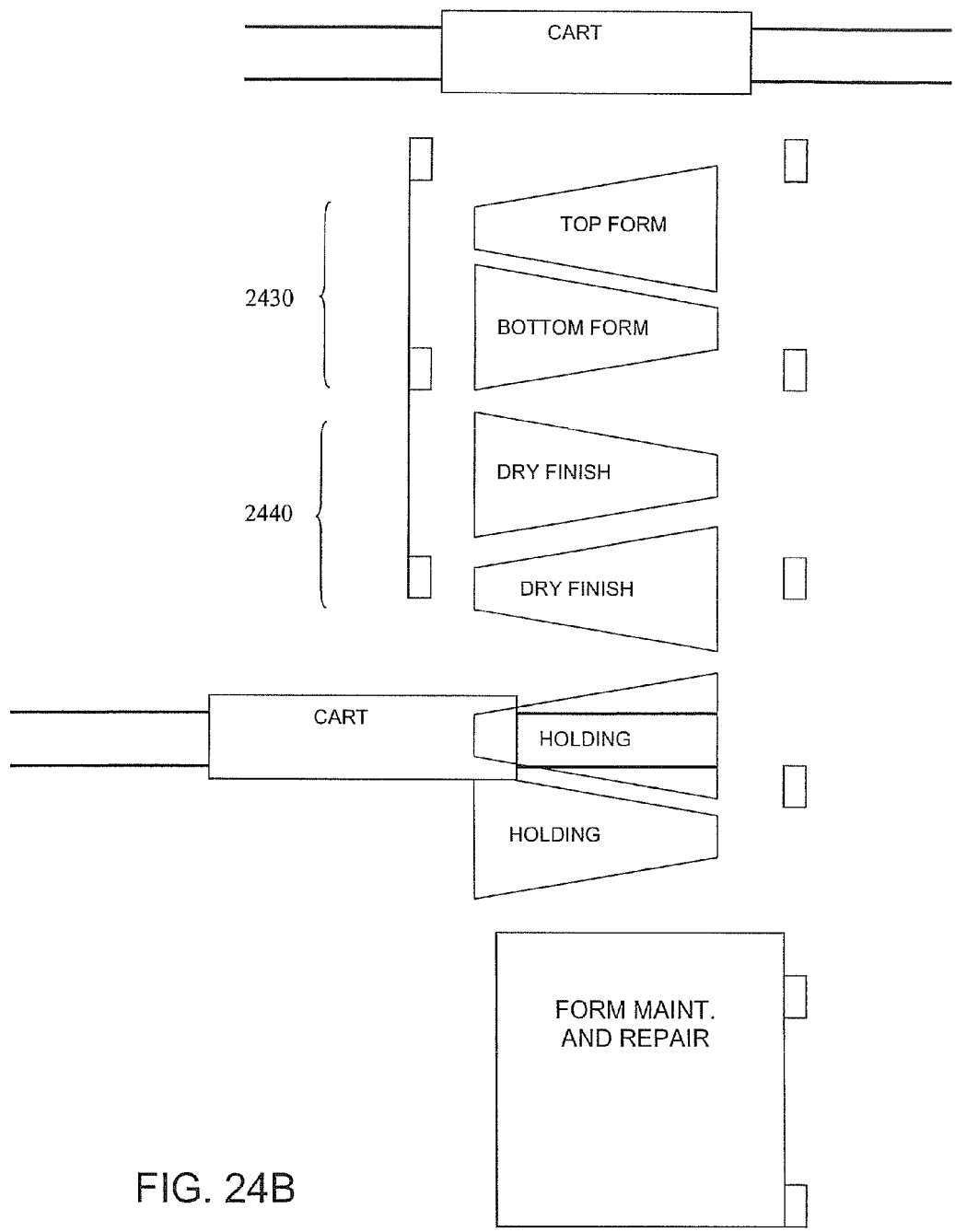
Figure 24C:
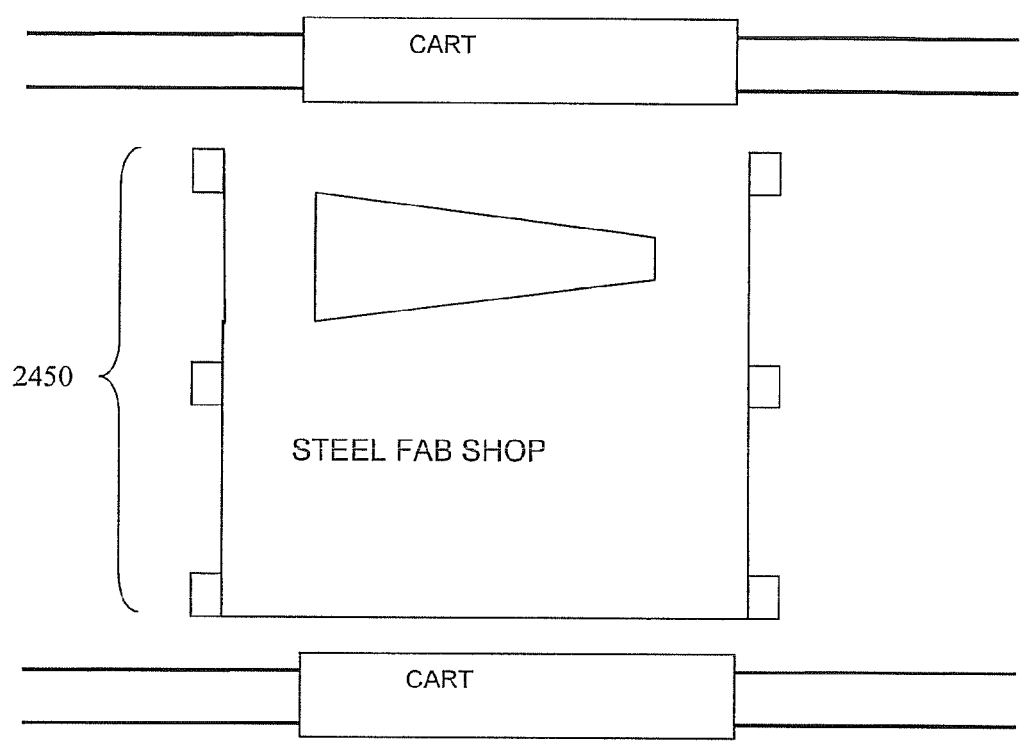
Figure 24D:
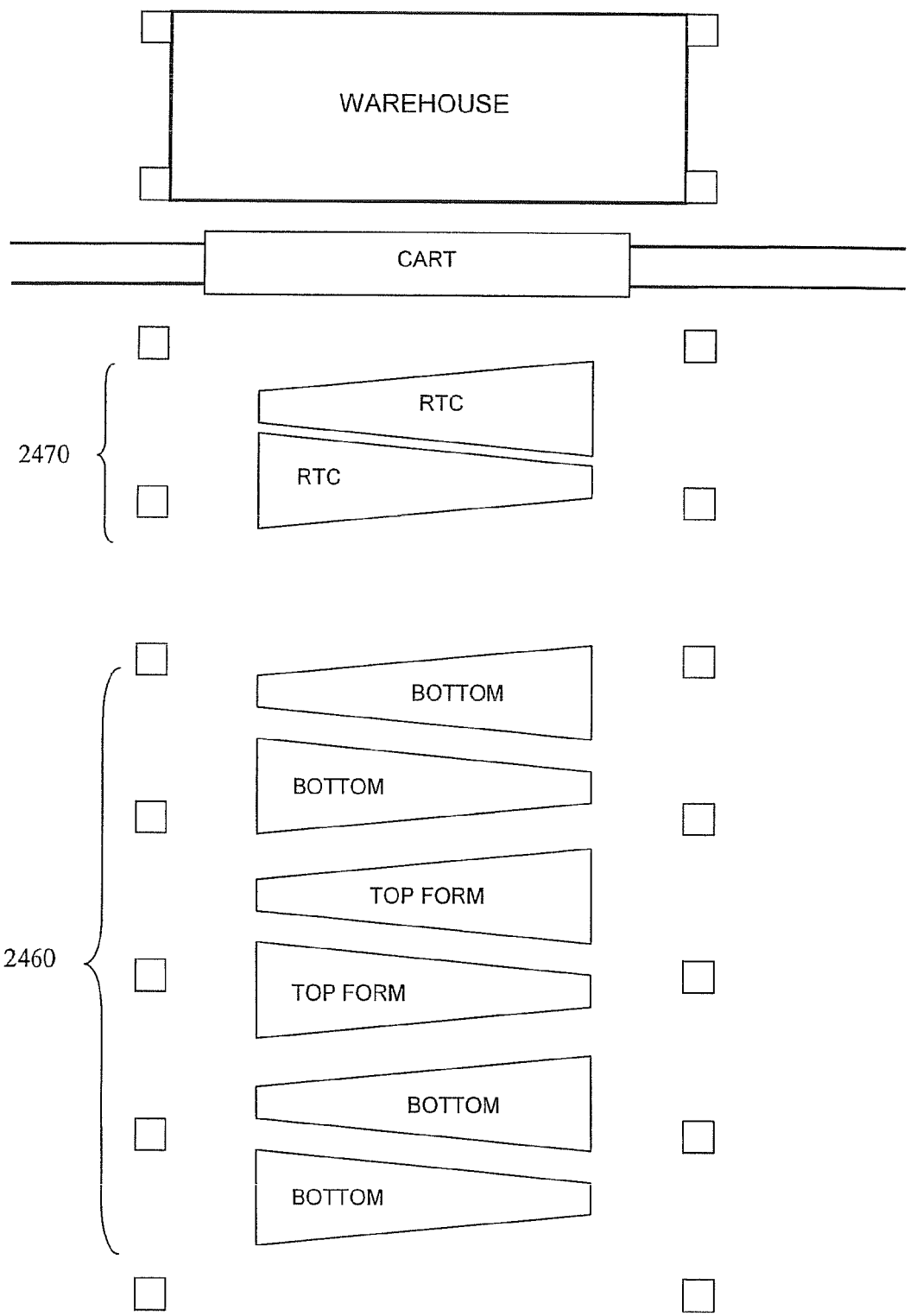

With reference now to FIG. 24 and subfigures, FIGS. 24A-24D, an exemplary layout of a facility where the present technology may be utilized is illustrated. As shown, FIG. 24 splits the exemplary layout of the facility into four quadrants. Quadrant "A" represents substantially where the equipment and apparatus depicted in FIG. 24A are located. Quadrant "B" represents substantially where the equipment and apparatus depicted in FIG. 24B are located. Quadrant "C" represents substantially where the equipment and apparatus depicted in FIG. 24C are located. Quadrant "D" represents substantially where the equipment and apparatus depicted in FIG. 24D are located.

With reference now to FIG. 24A, concrete is injected into concrete forms at casting table station generally 2410. As illustrated, casting table station 2410 includes two casting tables, casting table "A" and casting table "B". At casting table station 2410, concrete is injected into concrete forms similar to the manner discussed above with reference to FIGS. 19-21. Per present subject matter, the concrete form may be tilted along its longitudinal axis, its transverse axis, or both to minimize defects in the surface or surfaces of the casting.

After the concrete form has been completely injected with concrete at casting table station 2410, the concrete form may be moved, via crane as shown in FIG. 23 or by other form of transportation, to curing station 2420. At curing station 2420, the concrete form may be positioned substantially parallel with the floor of the facility, similar to the concrete form 2200 shown in FIG. 22. The concrete form remains at curing station 2420 until the casting inside the concrete form has hardened and cured. A period of eight hours is one example of approximate time in curing station 2420 which may be practiced in various present embodiments.

After the casting has cured inside the concrete form, the concrete form may be transported to station 2430, which transportation is represented in both FIG. 24A and FIG. 24B. At station 2430, the upper form is removed from the concrete form and the casting is removed. The casting may be removed, for example, by a crane connected to chains threaded through conduits in the casting (refer to exemplary conduits 1907 in present FIG. 19). After the casting has been removed from the concrete form at station 2430, the casting may be stored at station 2440 until it is transported from the facility.

After the casting has been removed from concrete form, both the upper form portion and the lower form of the concrete form may be transported to fabrication shop 2450 shown in FIG. 23C for repair, if necessary. In the alternative, the upper form and the lower form may be transported to concrete form prep station 2460 shown in FIG. 24D.

At concrete form prep station 2460, both the lower form and the upper form are cleaned and prepared for casting. During such process, the upper form is inverted and held upside down. A crane or other device may be used to invert the upper form. Once the upper form is inverted, various structural reinforcing members and conduits that are going to be cast into the concrete stave are placed and secured in the upper form. After the various structural reinforcing members and conduits have been placed in the inverted upper form, the upper form and the lower form are transferred to station 2470, where they wait to be used at casting table station 2410 shown in FIG. 24A.

Though not an aspect discussed in detail, each of FIGS. 24A through 24D variously illustrate railed carts which may be used for variously moving form and/or poured concrete pieces from station to station. The railed carts may also be used to transport concrete or other concrete pumping systems from station to station. Details of such railed cart operations or similar are well understood by those of ordinary skill in the art and form no particular aspect of the present subject matter.

Figure 25:
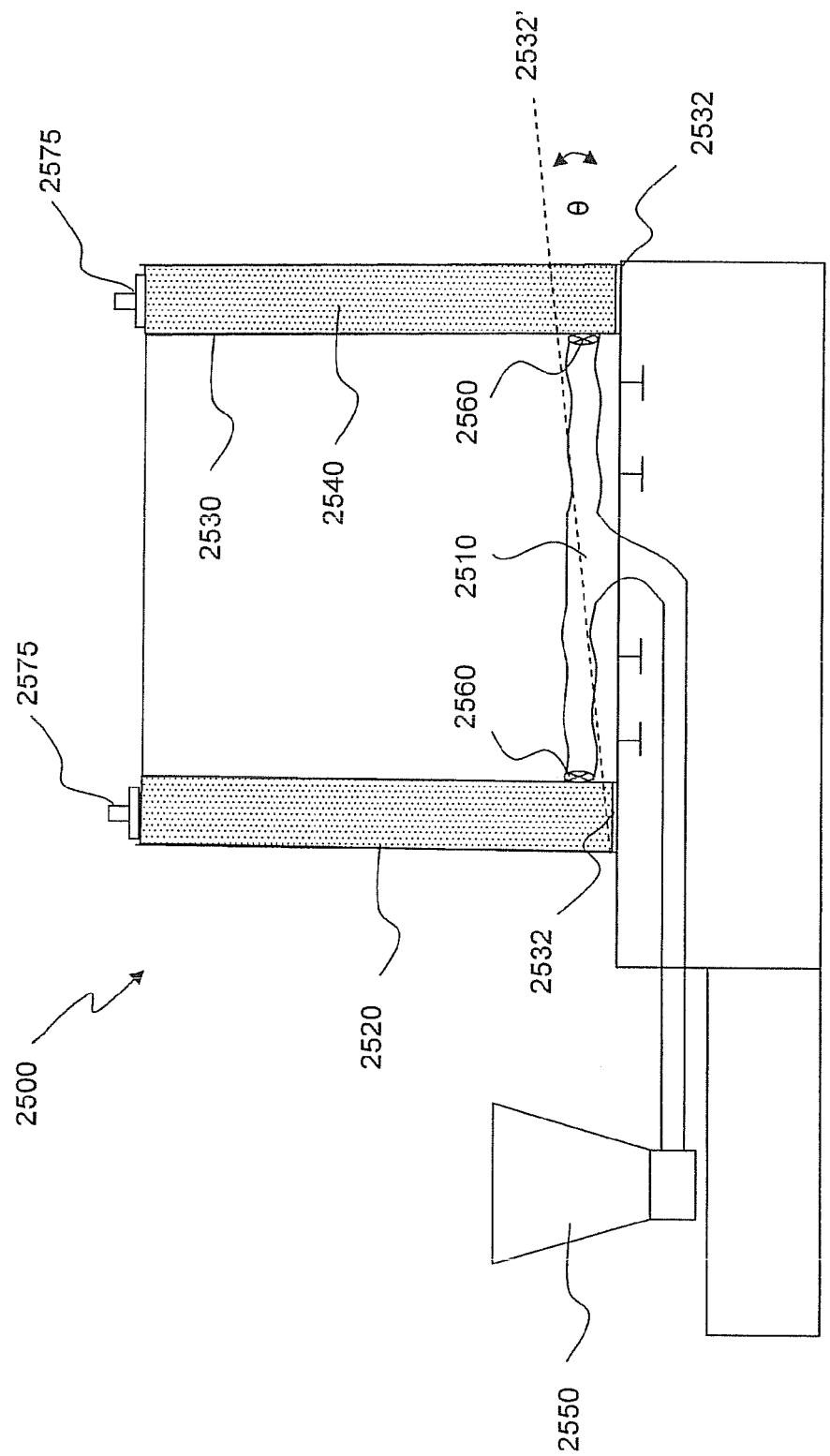
FIG. 25 illustrates a further exemplary concrete form in accordance with the present subject matter, used to cast ring structures for use in exemplary embodiments of the present technology.
Figure 26:
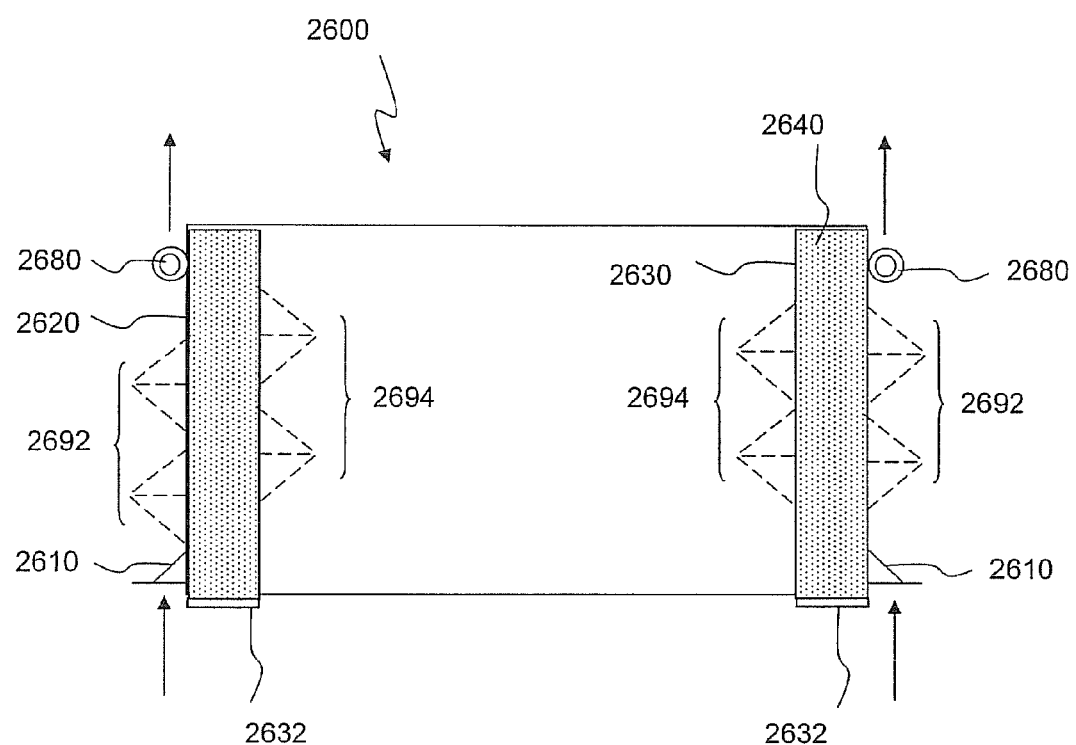
FIG. 26 illustrates another view of an exemplary concrete form used to cast ring structures for use in exemplary embodiments of the present technology.

Referring now to FIGS. 25-27, a concrete form may be seen that is used to cast concrete precast ring structures for use in the base support. The concrete form is used to cast injection mold concrete ring structures in a manner that replicates the accuracy, precision, and finishes of known match-casting techniques. Precast concrete ring structures molded using the techniques and apparatus described herein have minimized defects in the surface or surfaces of the ring structure, allowing for accurate matching with other structures used to construct the base support, including other ring structures or transition pieces of the base support, such as transition piece 312 shown in FIG. 3. In such manner, the various structural components of the base support may be secured together using adhesives as opposed to grouted joint techniques.

With reference now to FIG. 25, an exemplary concrete form generally 2500 used to manufacture injection mold concrete ring structures is illustrated. The concrete form 2500 forms an almost completely enclosed cavity into which concrete is pumped from concrete feed yoke 2510 to form casting 2540. As illustrated, concrete form 2500 includes an outer diameter form 2520 and an inner diameter form 2530. Inner diameter form 2530 includes a bottom surface 2532 upon which the bottom surface of the casting 2540 rests. Once the concrete form 2500 has been filled with concrete, the casting 2540 cures and hardens inside the cavity formed by the concrete form 2500 to form a concrete ring structure. Concrete form 2500 may also include various conduits or other structural components that are cast into the ring structure, the details of which may vary in accordance with the particular component or resulting structure under consideration.

Concrete feed yoke generally 2510 may be connected at one end to a concrete supply source 2550. The concrete supply source 2550 (not shown) may be configured to provide a supply of any type or mix of concrete as desired or as needed in a particular instance for injection into concrete form 2500. For example, concrete supply source may provide a supply of a self-consolidating concrete mix for injection into the concrete form 2600. As illustrated in FIG. 25, concrete feed yoke 2510 may include a Y-joint to split the flow of concrete to opposite sides of the concrete form 2500. Concrete feed yoke 2510 injects concrete into the concrete form 2500 through injection ports in the concrete form 2500. The concrete form 2500 may have a plurality of injection ports located throughout the height of the concrete form 2500, similar to the plurality of injection ports 1912, 1914, 1916, and 1918 discussed in conjunction with present FIG. 19.

As illustrated, concrete feed yoke 2510 injects concrete 2540 into concrete form 2500 through cut-off valves 2560 provided in the concrete form 2500 at the plurality of concrete injection ports. The cut-off valve may be a part of the concrete form 2500 itself and may be adapted to provide a tight seal for the concrete form 2500 when concrete is not being injected through the cut off valve 2560. The valve 2560 should be adapted so that it can open and close even after concrete has cured in the area adjacent the valve 2560, as in the case with valves 2060 discussed above in conjunction with present FIG. 20.

In accordance with the present subject matter and methodologies, the concrete feed yoke 2510 may be adapted to inject concrete into the concrete form 2500 from the lowest elevation of the concrete form 2500 to the highest. For example, once the area corresponding to the lowest injection port is filled, the concrete feed yoke 2510 may be moved further upward to an injection port at a higher elevation. By injecting concrete into the tilted concrete form starting from the lowest elevation of the concrete form to the highest elevation, defects in the surface of a casting molded in the concrete form generally 2500 may be minimized in accordance with the present subject matter.

Concrete form 2500 may also have ventilation ports 2575 to allow for the escape of air when the concrete form 2500 is being filled with concrete. Ventilation ports 2575 may be any type of vent for allowing the escape of air, and may operate with or without vacuum assistance. After the concreted form 2500 has been filled with concrete, the ventilation port may be configured to be closed-off to provide a completely enclosed environment for curing of the concrete. In addition, using the teachings provided herein, those of ordinary skill in the art should appreciate that the number and location of ventilation ports 2575 may varied as desired or needed without deviating from the scope or spirit of the present technology.

Referring still to FIG. 25, it can be seen that similar to the concrete form for casting staves described in FIGS. 19-13, the concrete form generally 2500 may be tilted at a varying angle or angles θ about a longitudinal and/or transverse axis such that the bottom surface 2532 of the inner diameter form 2532 is aligned along dashed line 2532' of FIG. 25. The angle θ be any angle in the range from about 0° to about 90° (or above in some circumstances).

Referring now to FIG. 26, the methodology and apparatus for stripping the casting 2640 from concrete form 2600 will now be discussed in detail. First, outer diameter form 2620 is removed from the casting 2640 such as with the assistance of jacks pushing up on jack supports 2610 and such as with cranes pulling up on attachment elements 2680.

Due to the thermal expansion of the concrete form 2600 during the curing process of the casting 2640, it is helpful to create a temperature gradient between the concrete form 2600 and the casting 2640 to assist in removal of the outer diameter form 2620 from the casting 2640. In one embodiment, such temperature gradient is created by spraying steam or other high temperature water mixture generally 2692 onto the outer diameter form 2620. In other embodiments, the thermal gradient may be created using thermal insulation materials or embedded heaters in the outer diameter form 2620. After the outer diameter form 2620 has been sufficiently heated by the high temperature water mixture 2692, the outer diameter form 2620 may be more easily removed from the casting 2640.

Figure 27A:
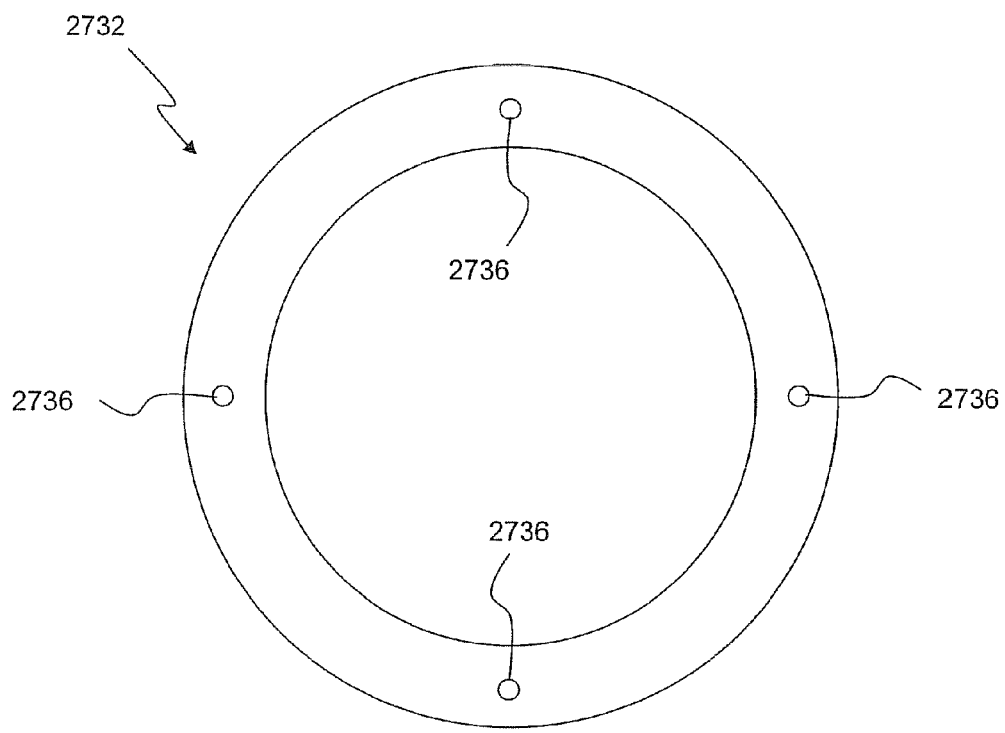
FIGS. 27A through 27C variously illustrate the bottom surface of an exemplary inner diameter concrete form used to cast ring structures for use in exemplary embodiments of the present technology, specifically with FIGS. 27B and 27C illustrating, respectively, enlarged plan and cross-section views of exemplary jacking port features of the present technology otherwise representatively illustrated in present FIG. 27A.
Figure 27B:
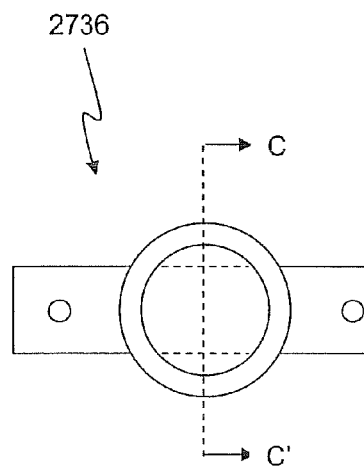
Figure 27C:
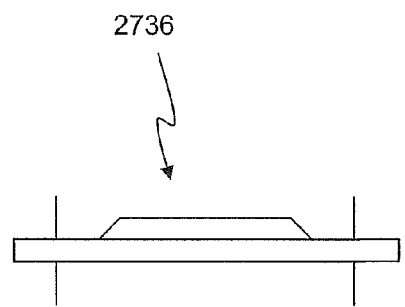

After the outer diameter form 2620 has been removed from the casting, the casting 2640 is removed from the inner diameter form 2630. The casting 2640 may be removed with the assistance of such as cranes pulling up on the casting 2640 as well as with such as jacks pushing up on the bottom surface 2632 of the inner diameter form 2630 through jacking ports. Jacking ports are illustrated in detail in FIG. 27A. FIG. 27A provides a plan view of the bottom surface 2732 of an inner diameter form having a plurality of jacking ports 2736. Further details of jacking ports 2736 are provided in FIGS. 27B and 27C.

Similar to the outer diameter form 2620, it is helpful to create a temperature gradient between the concrete form 2600 and the casting 2640 to assist in removal of the inner diameter form 2630 from the casting 2640. In the case of the inner diameter form 2630, however, it is desirable to provide the opposite thermal gradient to that provided between the outer diameter form 2620 and the casting 2640. Accordingly, such temperature gradient is preferably created by spraying an ambient temperature water mixture, water vapor, or air, generally 2694, onto the inner diameter form 2630. After the inner diameter form 2630 has been sufficiently cooled by the ambient temperature water mixture 2694, the inner diameter form 2630 may be more easily removed from the casting 2640.

While the present subject matter has been described in detail with respect to specific embodiments thereof, it will be appreciated that those skilled in the art, upon attaining an understanding of the foregoing, may readily produce alterations to, variations of, and equivalents to such embodiments, both as to present methodologies and apparatus. Accordingly, the scope of the present disclosure is by way of example rather than by way of limitation, and the subject disclosure does not preclude inclusion of such modifications, variations, and/or additions to the present subject matter (either concerning apparatus or methodology) as would be readily apparent to one of ordinary skill in the art.

What is claimed is:

1. A method for fabricating precast concrete structures for use in the construction of a support tower, comprising:
    providing a concrete form having a transverse axis and a longitudinal axis, such concrete form comprising a lower concrete form and an upper concrete form, the upper concrete form having a top surface and a bottom surface and being inverted so that such bottom surface of such upper concrete form is above such top surface of such upper concrete form;
    placing at least one structural member onto such bottom surface of such upper concrete form;
    securing such upper concrete form to such lower concrete form such that the concrete form defines an enclosed casting cavity having at least one concrete injection port and at least one ventilation port;
    tilting such concrete form about such transverse axis or such longitudinal axis or both such that a first area of such casting cavity is relatively raised with respect to a second area of such casting cavity; and
    injecting concrete into such casting cavity through such at least one injection port;
    wherein such injecting step comprises injecting concrete into such casting cavity upwardly from the second area of such casting cavity to the relatively raised first area thereof.

2. The method of claim 1, wherein such tilting step includes selectively tilting such concrete form about both its transverse axis and its longitudinal axis.

3. The method of claim 2, wherein such tilting step includes tilting such concrete form about 45° about its transverse axis and about 6° about its longitudinal axis.

4. The method of claim 1, further including:
    providing such concrete form with a plurality of anchors; and
    securing pre-stressing tendons to such plurality of anchors prior to injecting concrete into such casting cavity.

5. The method of claim 1, further comprising:
    vibrating such concrete form to assist injection and/or consolidation of concrete into such casting cavity; and
    curing such concrete in such casting cavity to form a casting.

6. The method of claim 1, further including:
    curing such concrete in such casting cavity to form a casting; and
    heating such concrete prior to injecting and/or heating such casting cavity to assist curing of such concrete in such casting cavity.

7. The method of claim 6, wherein heating such casting cavity includes providing thermal insulation materials and/or embedded electric heaters for the concrete form.

8. The method of claim 1, further including:
    providing such injection port with a shut-off valve; and
    closing such shut-off valve after concrete has been injected into such injection port.

9. The method of claim 1, further including:
    providing such concrete form with a plurality of injection ports disposed along such casting cavity;
    injecting concrete made with high flow or self-consolidating concrete mix into a first injection port of such plurality of injection ports; and
    injecting concrete made with high flow or self-consolidating concrete mix into a second injection port of such plurality of injection ports, with such second injection port relatively raised with respect to such first injection port.

10. The method of claim 1, wherein such casting cavity is shaped to form one of a concrete stave with a top portion and with a lower portion having a greater width than such top portion, or to form a concrete tubular structure.

11. The method of claim 1, wherein the casting cavity is substantially enclosed.

12. A method of fabricating concrete structures for use in the construction of a support tower, comprising:
    providing a lower concrete form defining a transverse axis and a longitudinal axis;
    providing an upper concrete form having a top surface and a bottom surface;
    inverting such upper concrete form so that such bottom surface of such upper concrete form is above such top surface of such upper concrete form;
    placing structural members onto such bottom surface of such upper concrete form;
    securing such upper concrete form to such lower concrete form so as to collectively construct a concrete form assembly defining an enclosed casting cavity having at least one concrete injection port and at least one ventilation port;
    tilting such concrete form assembly about such transverse axis or such longitudinal axis or both such that a first casting area of such casting cavity is raised with respect to a second casting area of such casting cavity;
    injecting concrete into such casting cavity through such at least one concrete injection port thereof, upwardly from such second casting area of such casting cavity to such first casting area thereof such casting cavity;
    curing such concrete in such enclosed casting cavity to form a casting;
    separating such upper concrete form from such lower concrete form; and
    removing such casting;
    wherein such curing includes heating such casting cavity to assist curing of such concrete in such casting cavity.

13. The method of claim 12, wherein such tilting step includes tilting such concrete form about 45° about such transverse axis and about 6° about such longitudinal axis.

14. The method of claim 12, further including:
    providing such concrete form with a plurality of injection ports disposed along such casting cavity;
    injecting concrete into a first injection port of such plurality of injection ports; and
    injecting concrete into a second injection port of such plurality of injection ports, with such second injection port relatively raised with respect to such first injection port.

15. The method of claim 12, wherein such casting cavity is shaped to form one of a concrete stave with a top portion and with a lower portion having a greater width than such top portion, or to form a concrete tubular structure.

16. The method of claim 12, wherein heating such casting cavity includes providing thermal insulation materials and/or embedded electric heaters for at least one of the upper and lower concrete forms.

* * * * *